United States Patent
Fenney et al.

(10) Patent No.: US 11,263,811 B2
(45) Date of Patent: *Mar. 1, 2022

(54) TESSELLATION METHOD USING VERTEX TESSELLATION FACTORS

(71) Applicant: Imagination Technologies Limited, Kings Langley (GB)

(72) Inventors: Simon Fenney, St. Albans (GB); Vasiliki Simaiaki, London (GB)

(73) Assignee: Imagination Technologies Limited, Kings Langley (GB)

( * ) Notice: Subject to any disclaimer, the term of this patent is extended or adjusted under 35 U.S.C. 154(b) by 0 days.

This patent is subject to a terminal disclaimer.

(21) Appl. No.: 16/893,132

(22) Filed: Jun. 4, 2020

(65) Prior Publication Data

US 2020/0302690 A1   Sep. 24, 2020

Related U.S. Application Data

(63) Continuation of application No. 16/434,828, filed on Jun. 7, 2019, now Pat. No. 10,740,967, which is a
(Continued)

(30) Foreign Application Priority Data

Jun. 5, 2015   (GB) ..................... 1509764

(51) Int. Cl.
  *G06T 15/30*   (2011.01)
  *G06T 17/20*   (2006.01)
  *G06T 15/00*   (2011.01)

(52) U.S. Cl.
  CPC ............ *G06T 17/20* (2013.01); *G06T 15/005* (2013.01); *G06T 17/205* (2013.01)

(58) Field of Classification Search
  None
  See application file for complete search history.

(56) References Cited

U.S. PATENT DOCUMENTS 6,940,505 B1   9/2005   Savine et al.
8,169,437 B1   5/2012   Legakis et al.
(Continued)

FOREIGN PATENT DOCUMENTS

CN   102214369 A   10/2011
CN   103198512 A   7/2013
(Continued)

OTHER PUBLICATIONS

Bommes et al., "Integer-Grid Maps for Reliable Quad Meshing," ACM Transactions on Graphics, vol. 32, No. 4, Article 98, Jul. 2013.
(Continued)

*Primary Examiner* — Anh-Tuan V Nguyen
(74) *Attorney, Agent, or Firm* — Potomac Law Group, PLLC; Vincent M DeLuca

(57) ABSTRACT

A tessellation method uses vertex tessellation factors. For a quad patch, the method involves comparing the vertex tessellation factors for each vertex of the quad patch to a threshold value and if none exceed the threshold, the quad is sub-divided into two or four triangles. If at least one of the four vertex tessellation factors exceeds the threshold, a recursive or iterative method is used which considers each vertex of the quad patch and determines how to further tessellate the patch dependent upon the value of the vertex tessellation factor of the selected vertex or dependent upon values of the vertex tessellation factors of the selected vertex and a neighbor vertex. A similar method is described for a triangle patch.

20 Claims, 16 Drawing Sheets

Related U.S. Application Data continuation of application No. 16/200,081, filed on Nov. 26, 2018, now Pat. No. 10,360,725, which is a continuation of application No. 15/865,959, filed on Jan. 9, 2018, now Pat. No. 10,140,762, which is a continuation of application No. 14/997,718, filed on Jan. 18, 2016, now Pat. No. 9,892,554.

(56) References Cited

U.S. PATENT DOCUMENTS

| | | |
|---|---|---|
| 8,471,852 B1 | 6/2013 | Bunnell |
| 2002/0060685 A1 | 5/2002 | Handley et al. |
| 2002/0186216 A1 | 12/2002 | Baumberg et al. |
| 2004/0085312 A1 | 5/2004 | Buchner et al. |
| 2004/0114794 A1* | 6/2004 | Vlasic .................. G06T 15/205 382/154 |
| 2004/0162478 A1 | 8/2004 | Thesen |
| 2004/0174376 A1 | 9/2004 | Deering |
| 2004/0196285 A1 | 10/2004 | Rice et al. |
| 2005/0131660 A1 | 6/2005 | Yadegar et al. |
| 2007/0247458 A1 | 10/2007 | Surazhsky |
| 2009/0244063 A1 | 10/2009 | Dohta |
| 2010/0164955 A1 | 7/2010 | Sathe et al. |
| 2010/0214294 A1 | 8/2010 | Li et al. |
| 2010/0253683 A1 | 10/2010 | Munkberg et al. |
| 2011/0128285 A1 | 6/2011 | Gong |
| 2011/0310102 A1 | 12/2011 | Chang |
| 2011/0316854 A1 | 12/2011 | Vandrovec |
| 2012/0274984 A1* | 11/2012 | Wang ................... H04N 1/4055 358/3.2 |
| 2013/0162651 A1 | 6/2013 | Martin et al. |
| 2014/0111513 A1 | 4/2014 | Ceylan et al. |
| 2014/0210819 A1* | 7/2014 | Mei ....................... G06T 15/005 345/423 |
| 2014/0320495 A1 | 10/2014 | Clarberg et al. |
| 2015/0015580 A1 | 1/2015 | Kim et al. |
| 2016/0071317 A1 | 3/2016 | Kim et al. |
| 2016/0148424 A1 | 5/2016 | Chung et al. |

FOREIGN PATENT DOCUMENTS

| | | |
|---|---|---|
| CN | 103810756 A | 5/2014 |
| CN | 104584082 A | 4/2015 |
| GB | 2388507 B | 11/2005 |
| WO | 2009/099703 A2 | 8/2009 |

OTHER PUBLICATIONS

Settgast et al., "Adaptive Tessellation of Subdivision Surfaces," Computers & Graphics, vol. 28, pp. 73-78 (2003).

Tariq, "D3D11 Tessellation," Game Developers Conference, Mar. 2009.

* cited by examiner

TESSELLATION METHOD USING VERTEX TESSELLATION FACTORS

CROSS-REFERENCE TO RELATED APPLICATIONS AND CLAIM OF PRIORITY

This application is a continuation under 35 U.S.C. 120 of copending application Ser. No. 16/434,828 filed Jun. 7, 2019, which is a continuation of prior application Ser. No. 16/200,081 filed Nov. 26, 2018, now U.S. Pat. No. 10,360,725, which is a continuation of application Ser. No. 15/865,959 filed Jan. 9, 2018, now U.S. Pat. No. 10,104,762, which is a continuation of application Ser. No. 14/997,718 filed Jan. 18, 2016, now U.S. Pat. No. 9,892,554, which claims foreign priority under 35 U.S.C. 119 from United Kingdom Application No. 1509764.5 filed Jun. 5, 2015.

BACKGROUND

Tessellation is a technique used in computer graphics to divide up a set of surfaces representing objects in a scene into a number of smaller and simpler pieces, (referred to as primitives), typically triangles, which are more amenable to rendering. The resulting tessellated surface is generally an approximation to the original surface, but the accuracy of this approximation can be improved by increasing the number of generated primitives, which in turn usually results in the primitives being smaller. The amount of tessellation/sub-division is usually determined by a level of detail (LOD). An increased number of primitives is therefore typically used where a higher level of detail is required, e.g. because an object is closer to the viewer and/or the object has a more intricate shape. However, use of larger numbers of triangles increases the processing effort required to render the scene.

The sub-division into triangle primitives is typically performed on patches which are square or triangular in shape (i.e. a quad or a triangle) and which may be curved to fit to the surface of the object they represent (and hence may be referred to as 'surface patches') and/or have displacement mapping applied. The sub-division, however, is not performed on curved patches but is instead performed in the domain of the patch (e.g. as if the patch is planar rather than being defined by polynomial equation) which may be defined in terms of (u,v) parameters and referred to as 'parametric space'. This means that the tessellation process is independent of any curvature present in the final surface.

Tessellation may be performed ahead of time (e.g. to compute a number of different views of a scene at different levels of detail and/or from different viewpoints) or may be performed on the fly (e.g. to provide continuous or view-dependent levels of detail). With some existing tessellation methods, a user can experience undesirable visual effects where, although the requested level of detail is changed smoothly, the resulting tessellation changes in a discontinuous fashion and this may be referred to as 'popping'.

The embodiments described below are provided by way of example only and are not limiting of implementations which solve any or all of the disadvantages of known methods and apparatus for performing tessellation.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A tessellation method is described which uses vertex tessellation factors. For a quad patch, the method involves comparing the vertex tessellation factors for each vertex of the quad patch to a threshold value and when none exceed the threshold value, the quad is sub-divided into two or four triangles (e.g. depending upon whether the patch is a top level patch or a sub-quad which has been formed by sub-dividing a top level patch). If at least one of the four vertex tessellation factors exceeds the threshold value (which may be equal to one), a recursive or iterative method is used which considers each vertex of the quad patch and determines how to further tessellate the patch dependent upon the value of the vertex tessellation factor of the selected vertex or dependent upon values of the vertex tessellation factors of the selected vertex and a neighbor vertex. A similar method is described for a triangle patch.

A first aspect provides a method of performing tessellation in a computer graphics system, the method comprising: a) receiving an input comprising four vertices defining a quad patch, each vertex comprising a domain space coordinate and a vertex tessellation factor; b) comparing the vertex tessellation factors to a threshold value; c) in response to determining that all four vertex tessellation factors do not exceed the threshold value dividing the patch into two or four triangles; and d) in response to determining that at least one of the four vertex tessellation factors exceeds the threshold value: generating a center vertex to the patch and calculating a vertex tessellation factor and blend factor for the newly added center vertex; selecting in turn, each one of the four received vertices, and for each selected vertex: defining a vertex based on the selected vertex; in response to determining that the vertex tessellation factor of the selected vertex exceeds the threshold value or that the vertex tessellation factors of both neighbor vertices exceeds the threshold value, adding two new vertices to sub-divide each edge between the selected vertex and a neighbor vertex, calculating vertex tessellation factors and blend factors for the new vertices and providing the four vertices, which define a sub-quad and comprise the defined vertex, the center vertex and the two new vertices as a further input to (a); and in response to determining that the vertex tessellation factor of the selected vertex does not exceed the threshold value and the vertex tessellation factor of exactly one neighbor vertex exceeds the threshold, adding a new vertex to sub-divide an edge between the selected vertex and the neighbor vertex with the vertex tessellation factor which exceeds the threshold and dividing a sub-quad defined by the defined vertex, the newly added vertex, the center vertex and the other neighbor vertex into two triangles by connecting the defined vertex to a diagonally opposite vertex in the sub-quad.

In various examples, the method further comprises storing vertex data for re-use within a patch or sub-quad, such that a vertex added to subdivide an edge which is part of more than one sub-divided part of the patch or sub-quad is determined only once per patch or sub-quad. In some examples, a sub-divided part of a patch or sub-quad comprises a triangle or a sub-quad.

A second aspect provides hardware tessellation unit comprising hardware logic configured to: a) receive an input comprising four vertices defining a quad patch, each vertex comprising a domain space coordinate and a vertex tessellation factor; b) compare the vertex tessellation factors to a threshold value; c) in response to determining that all four vertex tessellation factors do not exceed the threshold divide the patch into two or four triangles; and d) in response to determining that at least one of the four vertex tessellation factors exceeds the threshold: generate a center vertex to the patch and calculating a vertex tessellation factor and blend factor for the newly added center vertex; select in turn, each one of the four received vertices, and for each selected vertex: define a vertex based on the selected vertex; in response to determining that the vertex tessellation factor of the selected vertex exceeds the threshold value or that the vertex tessellation factors of both neighbor vertices exceeds the threshold value, add two new vertices to sub-divide each edge between the selected vertex and a neighbor vertex, calculate vertex tessellation factors and blend factors for the new vertices and provide the four vertices, which define a sub-quad and comprise the defined vertex, the center vertex and the two new vertices as a further input to (a); and in response to determining that the vertex tessellation factor of the selected vertex does not exceed the threshold value and the vertex tessellation factor of exactly one neighbor vertex exceeds the threshold, add a new vertex to sub-divide an edge between the selected vertex and the neighbor vertex with the vertex tessellation factor which exceeds the threshold and divide a sub-quad defined by the defined vertex, the newly added vertex, the center vertex and the other neighbor vertex into two triangles by connecting the defined vertex to a diagonally opposite vertex in the sub-quad.

Further aspects provide a computer readable storage medium having stored thereon computer executable program code that when executed causes at least one processor to perform a method as described herein, a graphics processing unit comprising a hardware tessellation unit as described herein, a computer readable storage medium having encoded thereon computer readable program code defining the hardware tessellation unit as described herein and a computer readable storage medium having encoded thereon computer readable program code defining a hardware tessellation unit configured to perform the method described herein.

In various examples of any of the aspects described herein, the threshold value equals one.

The preferred features may be combined as appropriate, as would be apparent to a skilled person, and may be combined with any of the aspects of the invention.

BRIEF DESCRIPTION OF THE DRAWINGS

Embodiments of the invention will be described, by way of example, with reference to the following drawings, in which.

Figure 1:
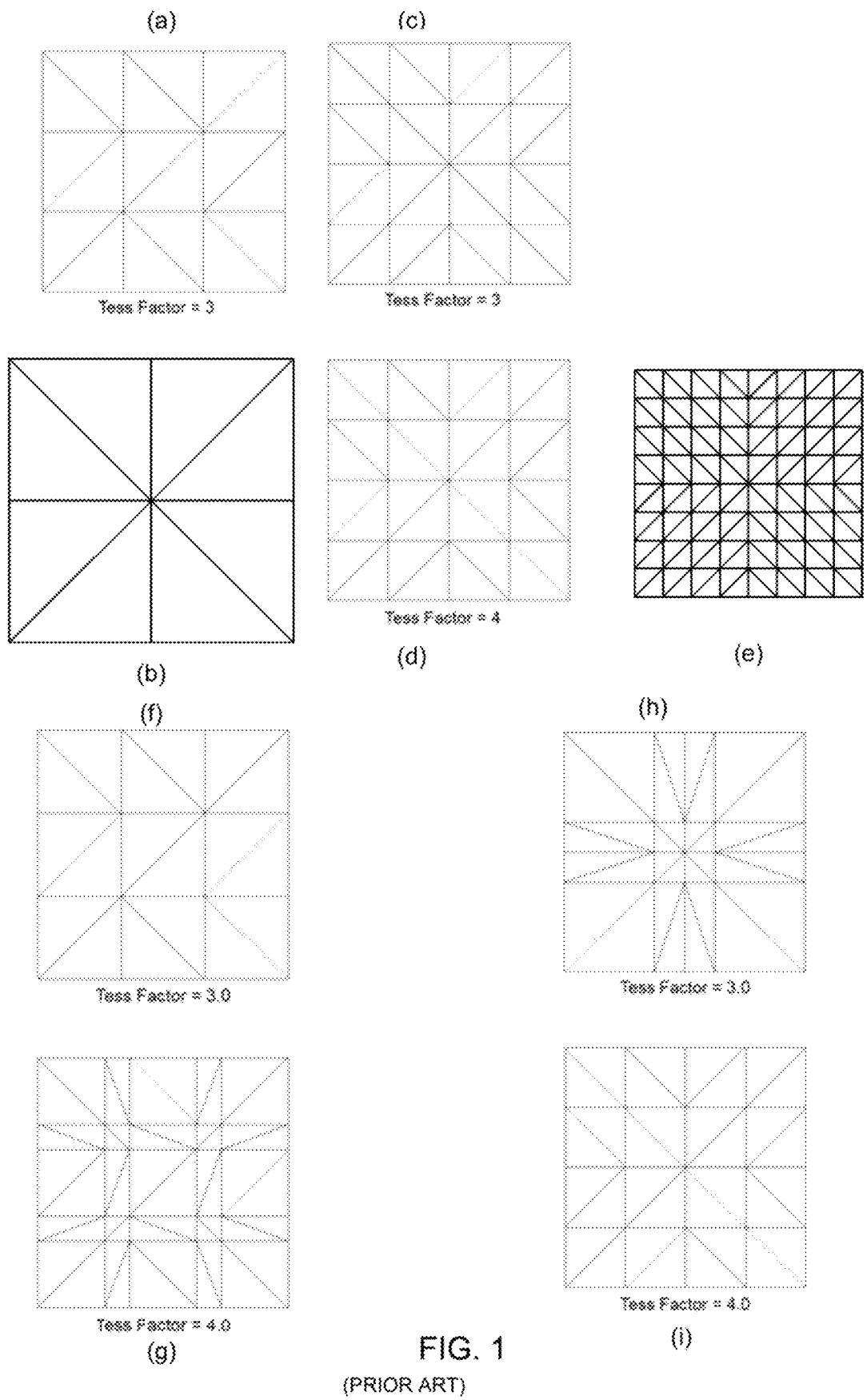
FIG. 1 shows the results of using various known tessellation methods.

Common reference numerals are used throughout the figures to indicate similar features.

DETAILED DESCRIPTION

Embodiments of the present invention are described below by way of example only. These examples represent the best ways of putting the invention into practice that are currently known to the Applicant although they are not the only ways in which this could be achieved. The description sets forth the functions of the example and the sequence of steps for constructing and operating the example. However, the same or equivalent functions and sequences may be accomplished by different examples.

There are a number of known tessellation methods which use an edge tessellation factor (TF) which is defined for each edge of a patch (e.g. of a quad or triangle) and which determine how many times the edge (and hence the patch) should be sub-divided. FIG. 1 shows how the resulting triangles differ when using different edge tessellation factors, but the same tessellation factor for each edge.

The first five examples (a)-(e) in FIG. 1 show:
(a) Integer partitioning, edge TF=3 for all four edges
(b) Integer partitioning, edge TF=4 for all four edges
(c) Power of two integer partitioning, edge TF=2 for all four edges
(d) Power of two integer partitioning, edge TF=4 for all four edges
(e) Power of two integer partitioning, edge TF=8 for all four edges With integer partitioning and power of two integer partitioning, the vertices along each edge are always evenly spaced; however, unwanted visual artifacts (such as popping) are very likely to occur where the sub-division level changes and the triangles are not tiny, but as small polygons incur additional rendering overhead, it is undesirable to make the polygons this small. The effect is particularly dramatic for power of two integer partitioning as the step size can be much larger.

Figure 2:
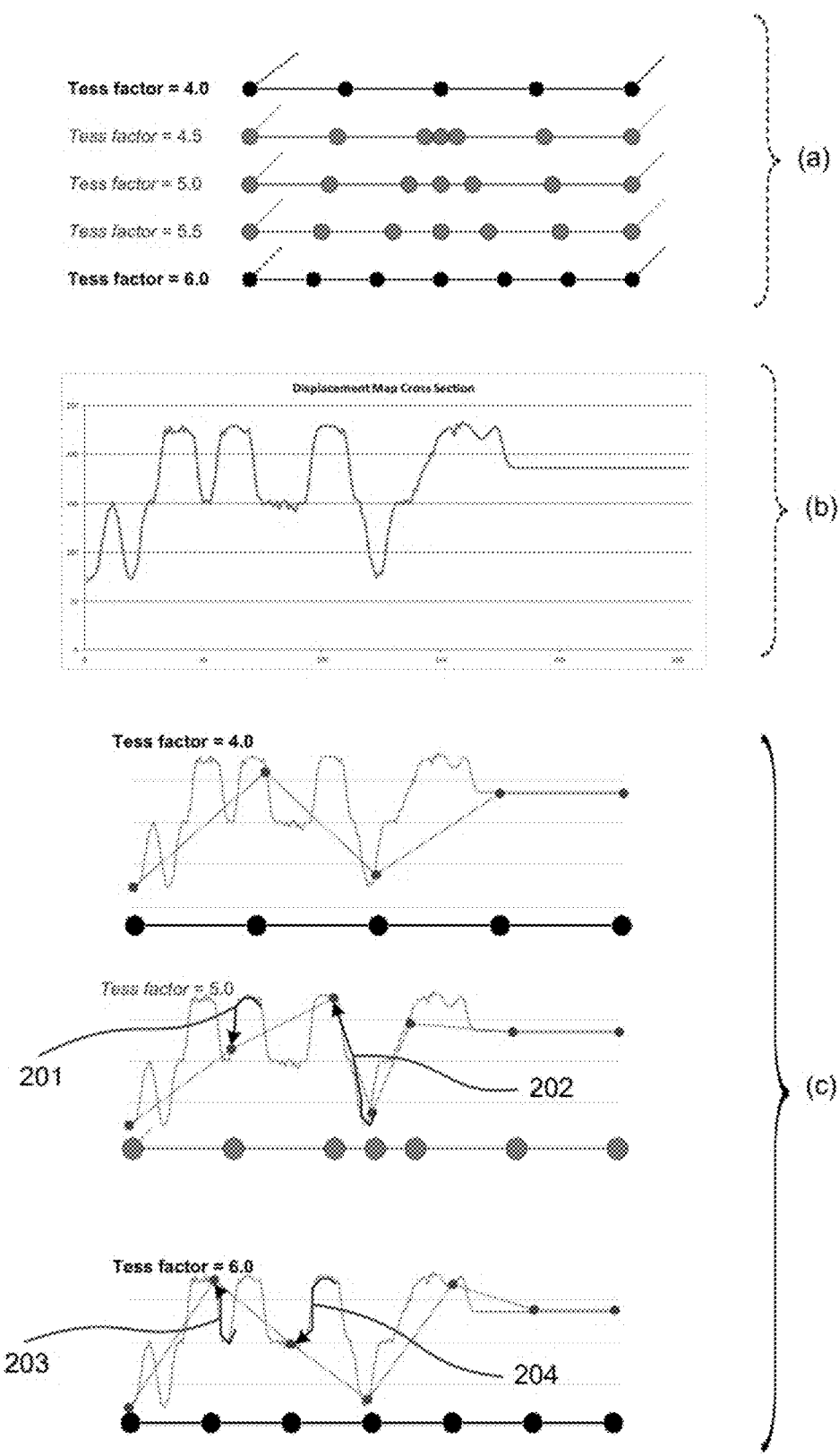
FIG. 2 shows the use of a displacement map with fractional partitioning.

The final four examples (f)-(i) in FIG. 1 show fractional partitioning methods which (unlike examples (a)-(d)) generate vertices at varying offsets:
e) Odd fractional partitioning, edge TF=3.0 for all four edges
f) Odd fractional partitioning, edge TF=4.0 for all four edges
g) Even fractional partitioning, edge TF=3.0 for all four edges
h) Even fractional partitioning, edge TF=4.0 for all four edges Some known systems avoid the 'popping' artifacts along the edges by allowing 'fractional' levels of detail (e.g. as shown in examples (f)-(i)), wherein any new vertices are initially created at the location of an existing vertex and those vertices gradually "slide" into position as the level of detail increases, as shown in FIG. 2(a) for just one edge in parameter space. Although the sudden jumps in representation are largely eliminated, such schemes can suffer from disturbing, unstable 'swimming/wobbling' artifacts, which can be exacerbated by the use of displacement mapping and this can be described with reference to FIGS. 2(b) and (c).

FIG. 2(b) shows an example displacement map cross-section and FIG. 2(c) shows how this cross-section is applied to an edge (e.g. the edges as shown in FIG. 2(a)) as the tessellation factor is changed. The arrows 201-204 show how the displacement of a vertex changes as the tessellation factor changes from 4.0 to 5.0 (arrows 201, 202) and from 5.0 to 6.0 (arrows 203, 204).

Figure 3:
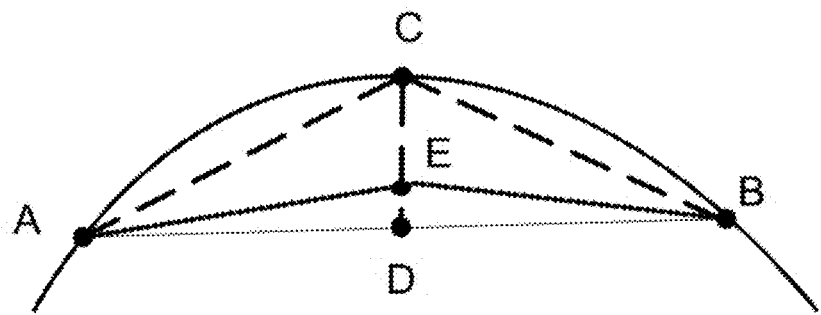
FIG. 3 is an example schematic diagram showing a method of generating a smooth transition as vertices are introduced.

Another solution to popping is described in GB patent no. 2388507 and shown in FIG. 3. In this example, the curve can be considered to be one of the edges of the patch, with points A and B being two of the corner vertices. If a further sub-division were performed, this would yield a new point C on the curve, which would correspond to a possible position of the middle vertex. Conversely, if the number of sub-divisions were to remain the same, then the curve would be approximated by the line AB and the middle vertex would lie on the line at point D. In order to achieve a smooth transition between points C and D as the level of sub-division changes, a new point E is calculated along the line CD and this is used as the value of the middle vertex. The position of E may be calculated using:

$$E = wC + (1-w)D$$

where w is the weight factor, derived from the fractional parts of the sub-division ratio, D is a first vertex value derived at a particular sub-division level and C is a second vertex value derived at a finer sub-division level. By using the equation above to calculate E, the new middle vertex smoothly transitions between points C and D.

Other considerations when selecting a tessellation method are not only the numbers of triangles generated for given combinations of edge tessellation settings, since the rendering cost of the tessellated model is partially dependent on the number of triangles, but also the aspect ratio of those triangles. Typically graphics systems (either software or hardware) will render an 'equilateral' triangle of a given screen area (i.e. screen pixels), which implies a minimum perimeter to area ratio, more quickly than a (long thin) triangle which has the same area but a higher perimeter to area ratio. Furthermore, when values, such as the results of shading, are computed at vertices and then interpolated across triangles, having more equilaterally-shaped triangles should result in fewer artifacts.

A further consideration is the complexity of the algorithm used to generate the pattern of triangles. Some known fractional tessellation schemes (e.g. such as the one developed by Guardardo and described in 'Real-Time Rendering' by Akenine-Möller and Haines, ISBN 1-56881-182-9, pages 524-525) result in non-uniform tessellation. If the algorithm can be kept simple and or regular (e.g. without having many 'special cases' that need to be handled differently), this can reduce hardware or software implementation costs.

A final desirable consideration is rotational/reflective symmetry in the tessellation pattern. It would be preferable that, for example, a quad patch defined with vertices, given in, say, clockwise order, ABCD and with appropriate tessellation factors, produce the same final triangle mesh as the 'equivalent' quad with vertices listed as BCDA. Some existing tessellation schemes do not guarantee this property (e.g. see the middle square in the 'odd' tessellation methods in examples (f) and (g) of FIG. 1).

A tessellation method is described below which does not use edge tessellation factors but instead uses tessellation factors defined for each vertex (or corner) of a quad or triangle. These tessellation factors are referred to as 'vertex tessellation factors' to distinguish them from the edge tessellation factors used in the known methods described above.

In the description a surface patch refers to a, usually finite, N-dimensional surface (or in the case of an isoline, an N-dimensional curve segment) which is the result of applying a parametric mapping function to a bounded 2D domain, which is either a quadrilateral or a triangle, (or in the case of an isoline, a 1D line segment). The resulting surface or isoline can be considered N-dimensional as it may include not only 3 (or 4) dimensions for Cartesian (or homogeneous) spatial positioning, but also other parameters such as texture coordinates. As described above, surface patches may be curved to fit to the surface of the object they represent and/or have displacement mapping applied. Tessellation (i.e. the sub-division of patches), however, is not performed in 'world space' (i.e. it is not performed on curved surface patches) but is instead performed in domain space (which may also be referred to as parametric space or parameter space) in which any position in the domain can be described by two coordinates (u,v) known as the domain space coordinates, which means that the tessellation process is independent of any curvature present in the final surface (although the user may take this curvature into account when determining the tessellation factors). When describing this tessellation method the term 'patch' is used to refer to an ordered set of two, three or four vertices (for an isoline, triangle or quad respectively) which bound a domain. The term 'vertex' is used generally to describe a location plus other attributes, where these attributes differ depending upon the context. For example, input control points and output vertices from a domain shader comprise a 3D position plus other parameters such as the normal, tangent, texture, etc., whereas the vertices within the tessellator (i.e. those used within the tessellation method) comprise a domain space coordinate and a vertex tessellation factor. These vertices within the tessellator are therefore not the same as the input control points or the resulting N-dimensional vertices that form the final triangles.

Figure 4:
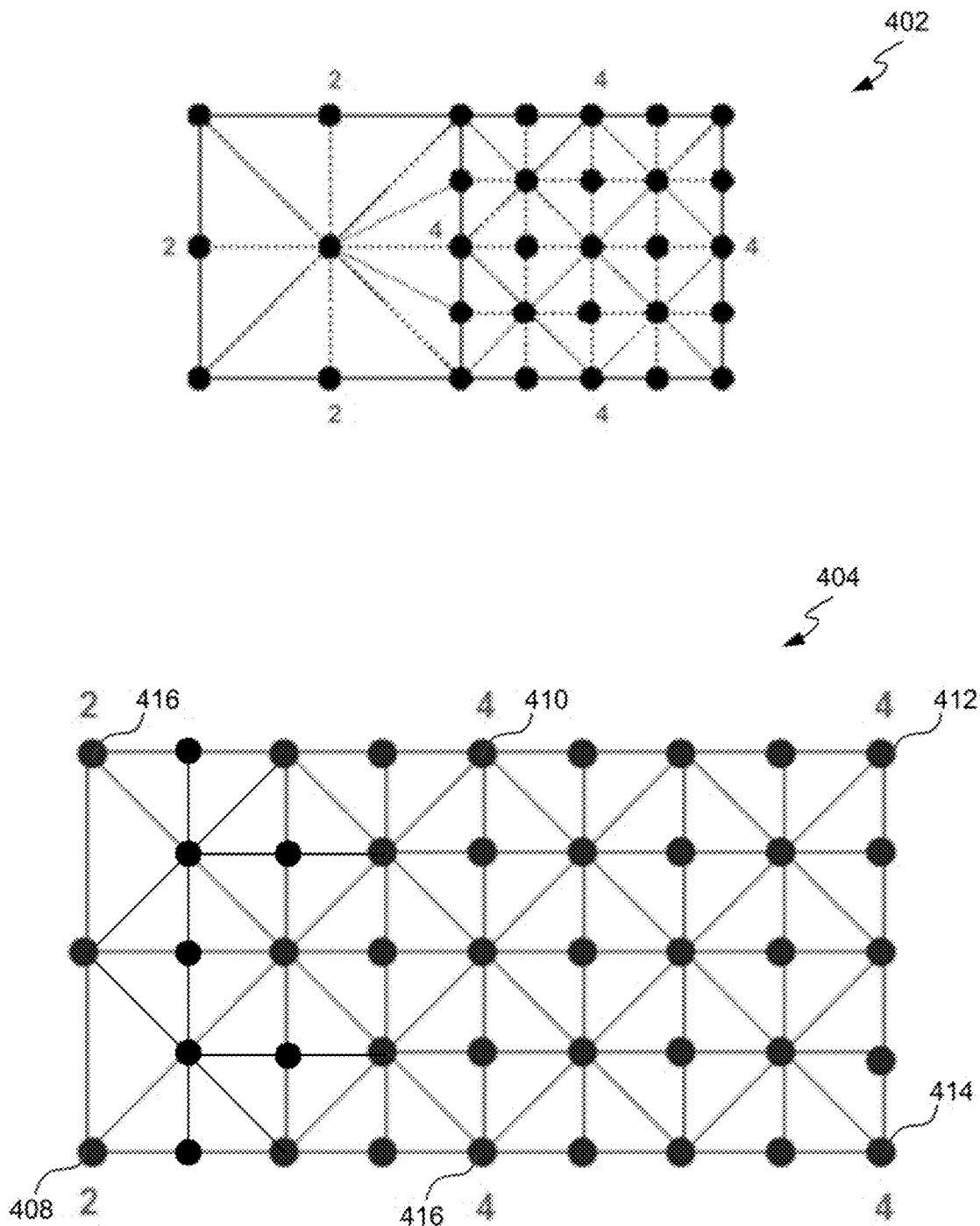
FIG. 4 is a schematic diagram showing examples of the different results obtained using a prior art method with edge tessellation factors and a method described herein which uses vertex tessellation factors.

Specifying the TF at the corners of the patch results in fewer abrupt changes in sizes and shapes of resulting triangles within the tessellated patch, because the partitioning of an edge is not fixed (i.e. to a value specified by the edge TF) but is instead determined by the vertex TFs at each end of the edge and varies smoothly not only along the original edge (in a 1D sense in parameter space) to produce a gradual transition between levels of sub-division, but also, in combination with the other TFs, allows it to vary smoothly across the patch in a 2D sense This is shown graphically in FIG. 4 which shows, in parametric space, the difference between defining the tessellation factor at the edges (diagram 402) using a known method and defining tessellation factors at the corners (or vertices, diagram 404). The first diagram 402 is the result of using power of two defined tessellation factors across the edges in the case of two quads with edge tessellation factors of 2 and 4. The second diagram 404 uses the method described below and vertex tessellation factors of 2 (for vertices 406, 408) and 4 (for vertices 410-416).

As is described below, along with the vertex-based tessellation factors, this method minimizes (or eliminates) undesirable visual artifacts because in many embodiments every vertex (e.g. each new vertex which is added as part of the sub-division into triangles) is either added a) at its final position in world space, b) at the mid-point of two or three other vertices which are at their final positions in world space and were the corners of a triangle in the immediately lower range of TF, or c) at a point which is a linear blend of the previous two options (e.g. by applying the technique shown in FIG. 3 to blend results between the positions achieved by (a) and (b)). The result is that vertices do not 'slide' across the surface as in some prior art (e.g. as shown in the examples in FIG. 2 and described above) as the level of detail (and hence TF) changes, which can cause swimming/wobbling artifacts. Instead vertices which are initially introduced at the midpoint of two, three, or four vertices present in a "lesser" TF, slowly 'grow out' to their final position in world space as the level of detail (LOD) increases (e.g. which may be determined by a viewer moving closer to an object). The reverse process occurs as the LOD/TF decreases.

Figure 5:
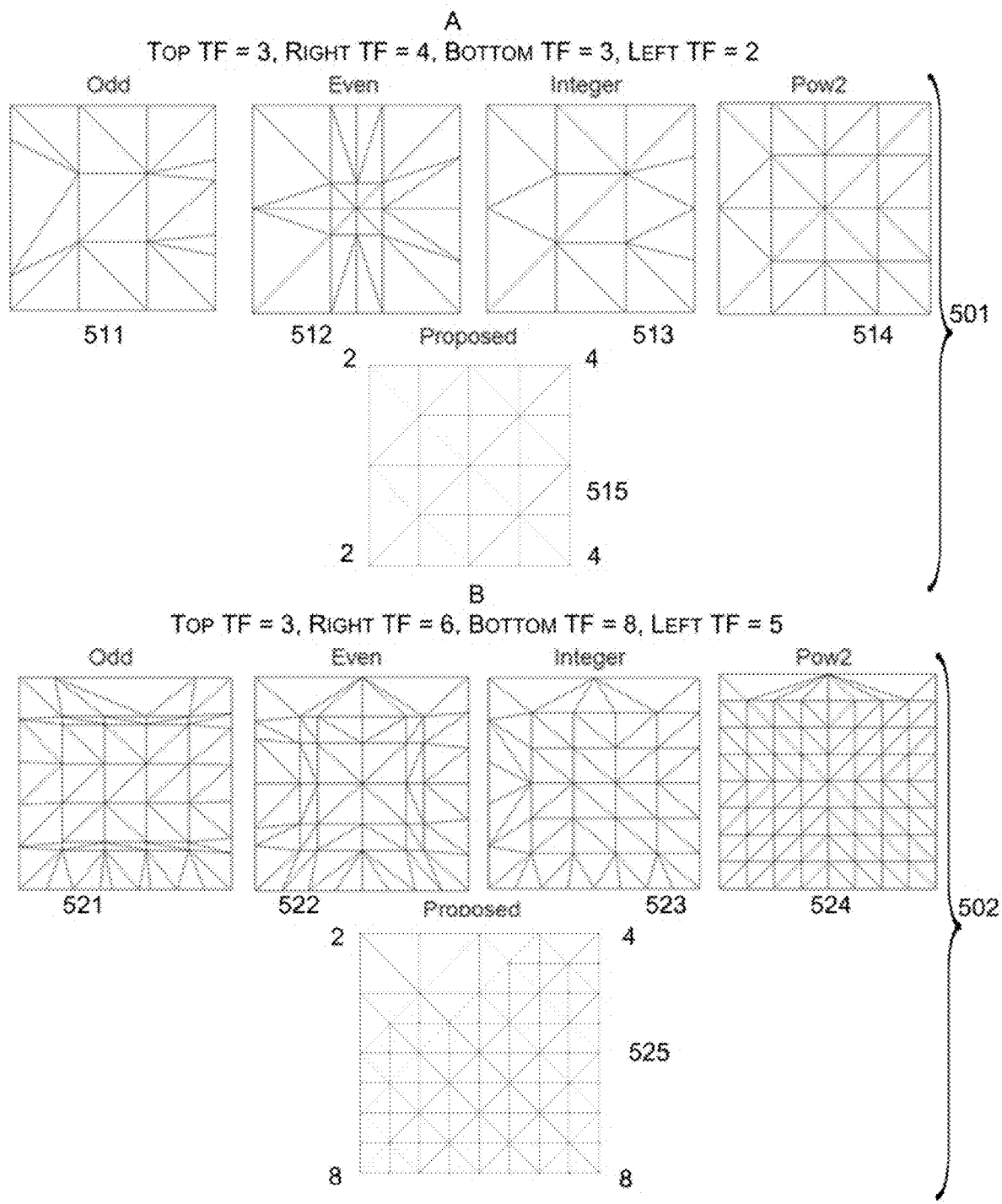
FIG. 5 is a schematic diagram showing further examples of the different results obtained using edge tessellation factors and vertex tessellation factors in the quad domain.
Figure 6:
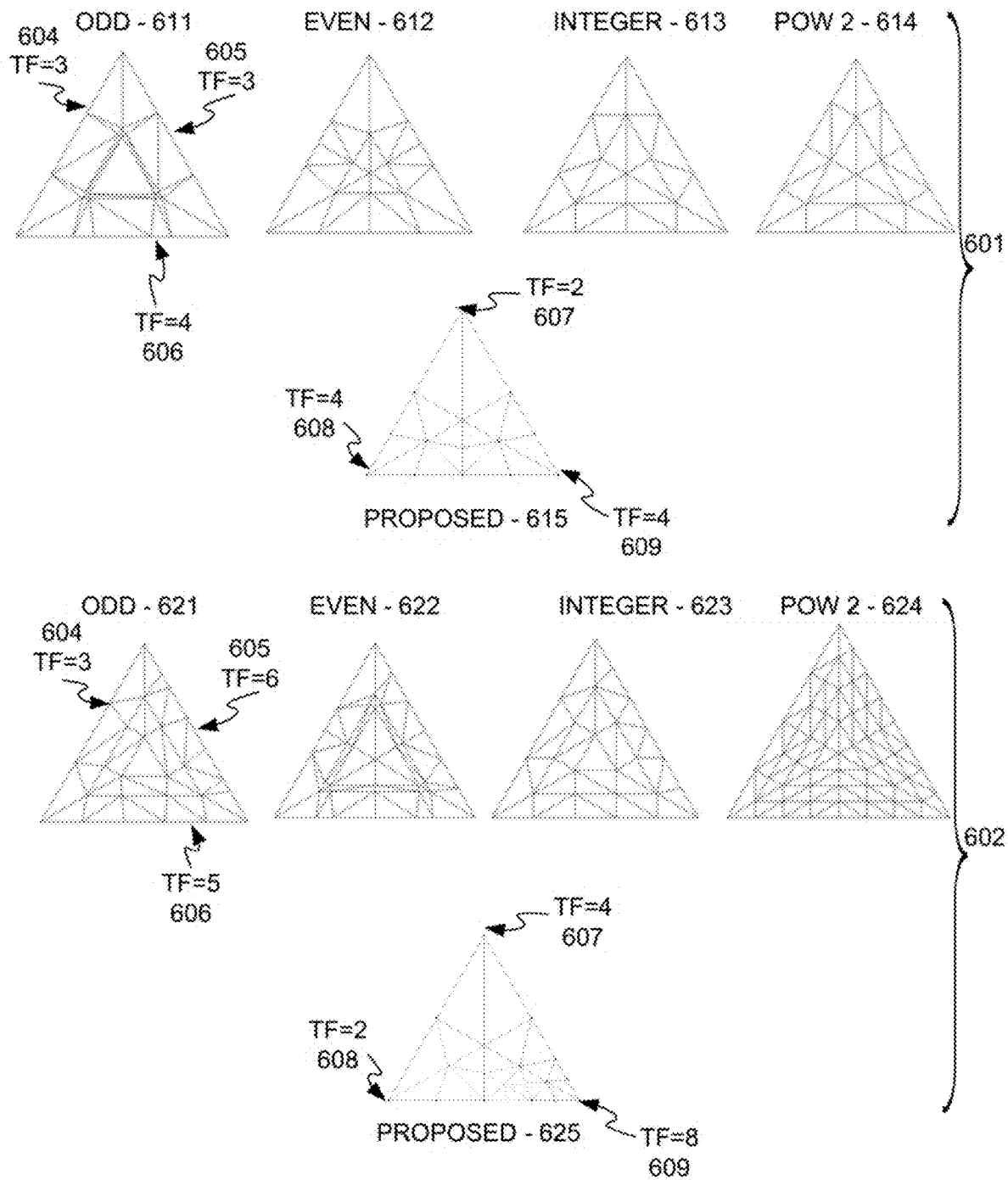
FIG. 6 is a schematic diagram showing further examples of the different results obtained using edge tessellation factors and vertex tessellation factors in the triangle domain.

FIGS. 5 and 6 show further comparisons between the results, again shown in parametric space, obtained using the method described below (which uses vertex tessellation factors) and the results obtained using other known methods of tessellation (which use edge tessellation factors). In these examples, in order to approximately produce the same level of tessellation in the edge-based tessellation schemes as in the new method, the edge tessellation factors have been set to be the average of the corresponding corner tessellation factors. The first example 501 in FIG. 5 shows a comparison of the results obtained using odd fractional partitioning 511, even fractional partitioning 512, integer partitioning 513 and power of two integer partitioning 514 for edge TFs of 3.0 for the top edge, 4.0 for the right edge, 3.0 for the bottom edge and 2.0 for the left edge and results 515 obtained using the method described below with vertex TFs of 2.0 for the top left vertex, 4.0 for the top right vertex, 4.0 for the bottom right vertex and 2.0 for the bottom left vertex. It can be seen that the method described below results in approximately the same number of sub-divisions as the known techniques; however, the transition between levels of detail is handled more smoothly, resulting in many fewer long thin triangles which, as noted earlier, are less desirable when rendering. This is also shown in the second example 502 in FIG. 5 which shows a comparison of the results obtained using odd fractional partitioning 521, even fractional partitioning 522, integer partitioning 523 and power of two integer partitioning 524 for edge TFs of 3.0 for the top edge, 6.0 for the right edge, 8.0 for the bottom edge and 5.0 for the left edge and results 525 obtained using the method described below with vertex TFs of 2.0 for the top left vertex, 4.0 for the top right vertex, 8.0 for the bottom right vertex and 8.0 for the bottom left vertex.

FIG. 6 shows the corresponding results for the triangle domain. The first example 601 in FIG. 6 shows a comparison of the results obtained using odd fractional partitioning 611, even fractional partitioning 612, integer partitioning 613 and power of two integer partitioning 614 for edge TFs of 3.0 for the left and right edges 604, 605 and an edge TF of 4.0 for the bottom edge 606 and results 615 obtained using the method described below with a vertex TF of 2.0 for the top vertex 607 and vertex TFs of 4.0 for the bottom two vertices 608, 609.

As with the quad domain example of FIG. 5, it can be seen that the method described below when applied to the triangle domain results in approximately the same number of sub-divisions as the known techniques; however, the transition between levels of detail is handled more smoothly, resulting in many fewer long thin triangles which, as noted earlier, are less desirable when rendering. This is also shown in the second example 602 in FIG. 6 which shows a comparison of the results obtained using odd fractional partitioning 621, even fractional partitioning 622, integer partitioning 623 and power of two integer partitioning 624 for edge TFs of 3.0 for the left edge 604, 6.0 for the right edge 605 and 5.0 for the bottom edge 606 and results 625 obtained using the method described below with a vertex TF of 4.0 for the top vertex 607, 2.0 for the bottom left vertex 608 and 8.0 for the bottom right vertex 609.

Further, with respect to the second examples 502 and 602 and especially noticeable with examples 521-523 and 621-623, is the relative complexity of the schemes. These prior art methods create an inner section, with a relatively regular N×M tessellation pattern, to which the outer boundary is then 'stitched' in a, less then desirable, semi-irregular fashion. This not only adds complexity to the tessellation process, which is undesirable, but also results in asymmetrical tessellation and less-evenly shaped triangles.

In the examples 515, 525, 615 and 625 in FIGS. 5 and 6 and in subsequent examples generated with the tessellation method described herein, the images provide an indication (in parameter space) of the blending that is performed when new vertices are added (as described in more detail below). The vertices which are shown as squares in any of the examples are in their "final" location, while progressively larger circles are used to show the vertices in an interpolated state, i.e. where their blend factor is in [0.0,1.0).

Figure 7:
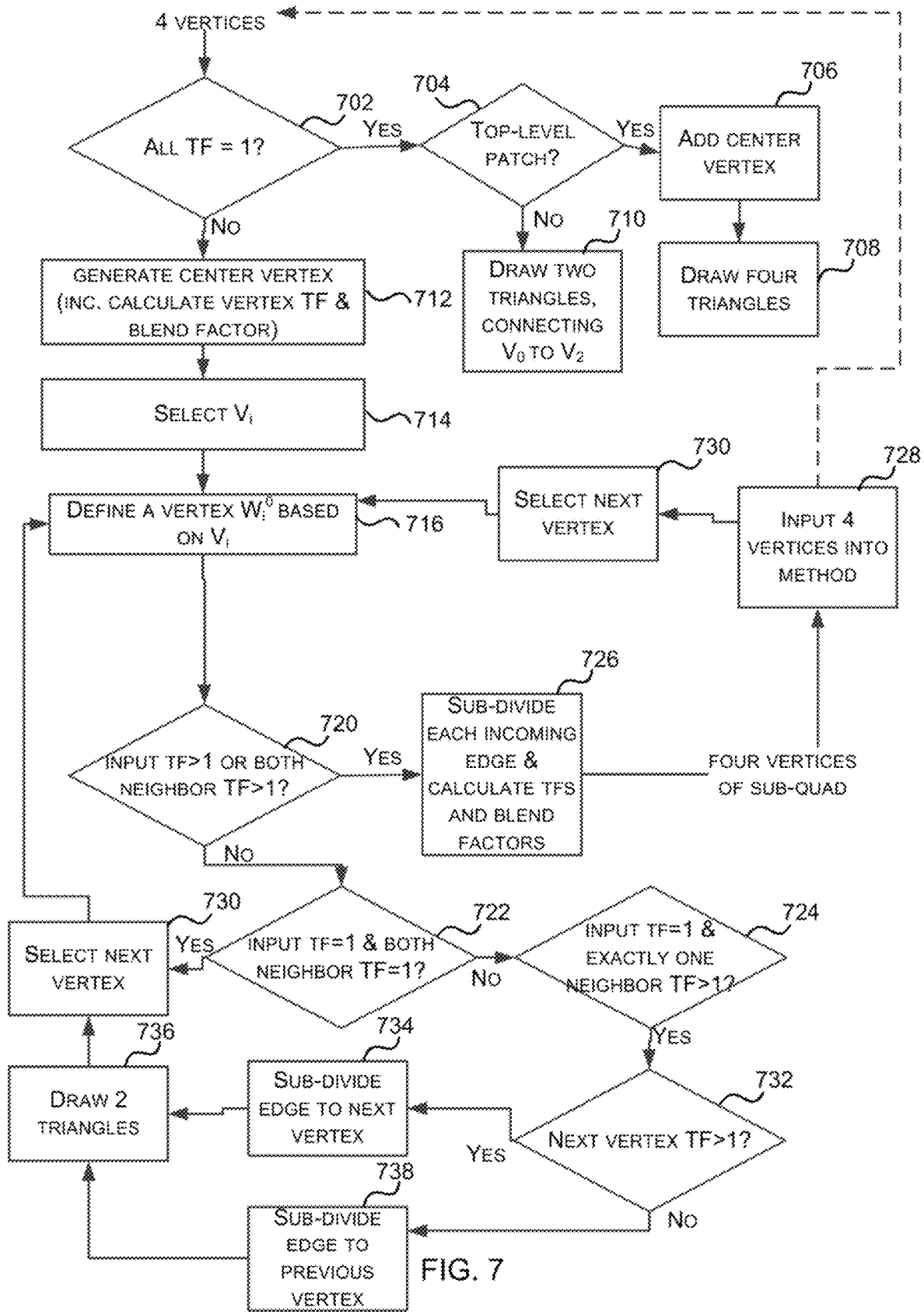
FIG. 7 is a flow diagram of an example tessellation method using vertex tessellation factors as applied to a quad input patch.
Figure 8:
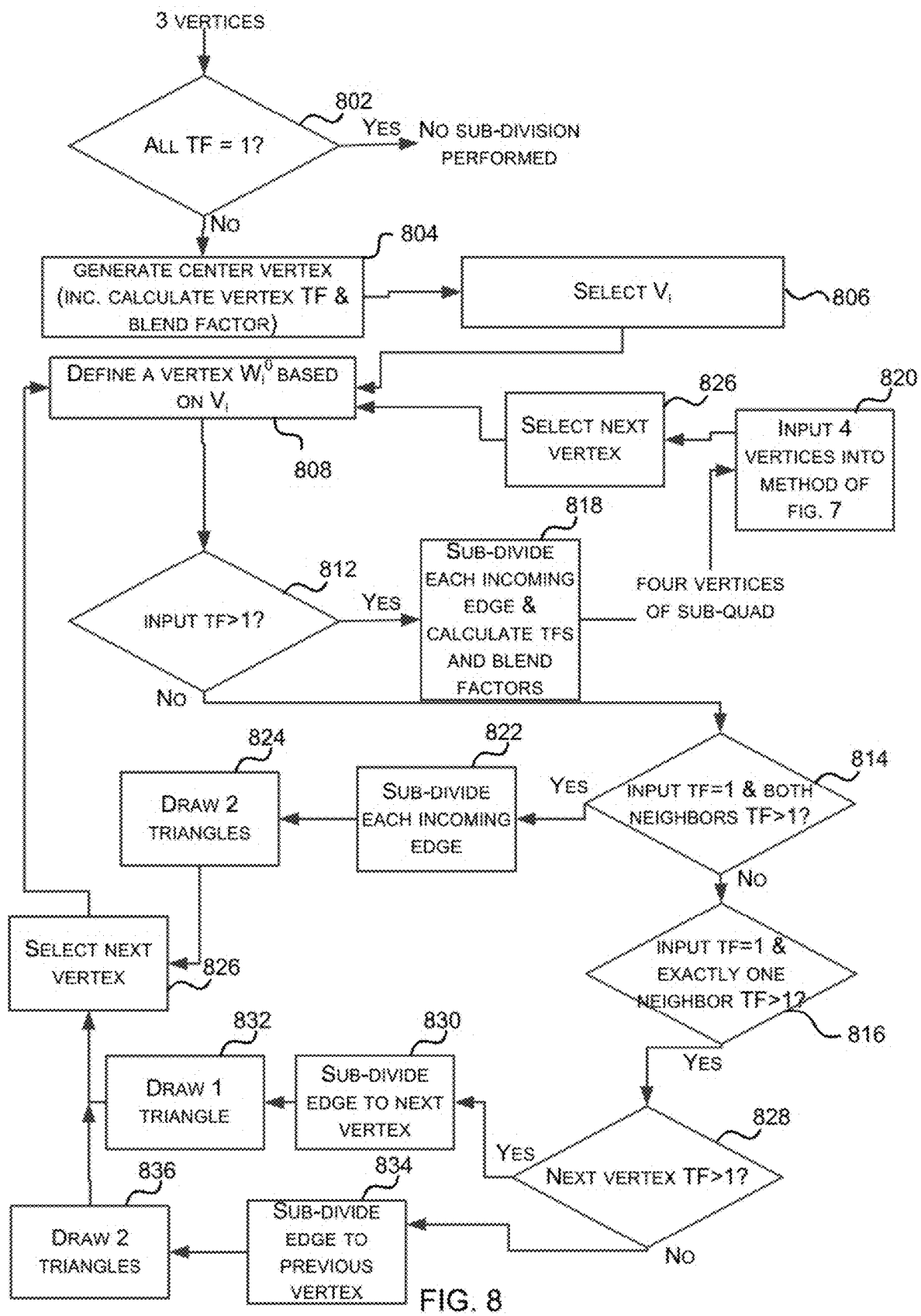
FIG. 8 is a flow diagram of an example tessellation method using vertex tessellation factors as applied to a triangle input patch.

The tessellation method which uses vertex tessellation factors can be described with reference to FIGS. 7 and 8 which are flow diagrams showing the method for quads (FIG. 7) and triangles (FIG. 8). A tessellation method may implement either or both of the methods shown in FIGS. 7 and 8.

The quad method (of FIG. 7) can be described with reference to the example quad shown in FIG. 9. The quad method receives four vertices, each comprising a domain space (i.e. (u,v)) coordinate and a vertex tessellation factor. The four vertices will be labeled $V_0$, $V_1$, $V_2$ and $V_3$, with corresponding tessellation factors, $TF_0$ through $TF_3$. In addition to the tessellation factors, each vertex will also maintain a blend factor, $BF_i \in [0.0, 1.0]$ (where i is the vertex index). For top-level patches, these per-vertex blend factors will be set to 1.0.

For a quad which is top-level patch, any vertex may be labeled as $V_0$ and then the remaining vertices are labeled in rotational order i.e. going around the quad in a clockwise or counter-clockwise order. Whichever direction is used for labeling the vertices (i.e. clockwise or counter-clockwise), a consistent order must be used throughout the tessellation method and for the purposes of the following description, a clockwise labeling convention is adopted. For a sub-quad, the four input vertices have already effectively been 'labeled' as $V_0$ through $V_3$, when these were formed from the respective parent quad. One skilled in the art may appreciate that there is at least one other equivalent reordering/relabeling that will maintain symmetry but, for the sake of simplicity in the examples, the default input labeling is used.

If all four vertex tessellation factors of a quad are 1.0, this will be referred to as a 'terminal quad'.

If a top level patch ('Yes' in block 704), is also a 'terminal quad', i.e. all four vertex tessellation factors equal one ('Yes' in block 702), a center vertex is added (block 706) and four triangles created by joining each input vertex to the center vertex (block 708). The center vertex which is added (in block 706) is added at a position in the final N-dimensional space, which is the average of the four vertices' N-dimensional locations.

The term 'top level patch' refers to an input patch to the tessellation method which may be a triangle or quad, although at this point, the determination (in block 704) is only whether the quad (defined by the four input vertices) is a top level patch. If the quad is not a top level patch it may be referred to as a sub-quad, where a sub-quad is formed by the sub-division, at some level, of an input patch, which, as described below, may be a quad patch or a triangle patch. The quad or triangle which is sub-divided at a particular level of sub-division to form a sub-quad is referred to as the parent of the sub-quad (where the parent may be an input patch or another sub-quad) and the sub-quad that results from the sub-division of the parent is referred to as the child.

If the quad is a terminal quad, i.e. all four vertex tessellation factors equal one ('Yes' in block 702), and the quad is not a top level patch ('No' in block 704), i.e. it is a sub-quad as formed by the sub-division of a top level quad, a triangle (as described below) or another sub-quad, a center vertex is not created, and instead a half-tessellated quad is formed by drawing two triangles by connecting the source vertex ($V_0$) of the sub-quad to diagonally opposite vertex, ($V_2$), of the sub-quad. The source vertex ($V_0$) of the sub-quad is the selected vertex (of the parent quad/triangle) when the sub-quad was formed. This creation of a half-tessellated quad (in block 710) is described in more detail below with reference to FIG. 9.

A reason for identifying a "terminal-quad top level patch" which is then divided into four triangles, rather than dividing it into only two triangles as with a 'terminal' sub-quad, is to have the desirable property of rotational/reflective symmetry as described earlier. This is not necessary for terminal sub-quads because, due to the order of selection of source vertex, symmetry is implicitly maintained. If, in a given embodiment, the guaranteed symmetry of terminal-top-level-patch quads is not required, a small reduction in triangles can be achieved by dividing a terminal top level patch into only two triangles.

If a finer granularity of tessellation is required throughout the patch, an alternative embodiment may opt to always tessellate 'terminal-quad' sub-quads into four triangles, however this will approximately double the number of generated triangles.

If at least one of the four vertex tessellation factors does not equal one ('No' in block 702), i.e. at least one of the four vertex tessellation factors is greater than one, a center vertex, $V_{Center}$ is generated for the quad, which includes computation of tessellation and blend factors (block 712). The center vertex which is generated (in block 712) has a position, which, in order to avoid popping artifacts, is a weighted blend of (i) either, for 'top level patches', the average of the positions of all four corner vertices in N-dimensional space, or, for 'sub quad' patches, of just two vertices, $V_0$ and its diagonal opposite $V_2$ and ii) computing the average of the locations in domain space and mapping that to N-dimensional space. The weight of the blend, which is a value in the range [0.0, 1.0], is determined as a function of the vertex tessellation factors, where a weight of zero returns case (i), a weight of one returns case (ii), and intermediate values are weighted sum. To avoid popping, the blend weight function must be continuous and as the tessellation factors of all the vertices approach 1.0, i.e. the quad approaches a "terminal quad", the computed blend weight must approach zero. In this example, the blend weight function is chosen to be $$\text{BlendWeightFunc}(TF_0, \ldots TF_3) = \text{MAX}_{i=0..3}(\text{MIN}(TF_i-1,1)) \quad \text{Equation 1:}$$

The vertex tessellation factor of the center vertex is calculated as a function of the four vertex tessellation factors such that function is continuous, preferably symmetric, and produces a result that is, initially, bounded by the minimum and maximum input tessellation factors. In this example, the function is chosen to be:

$$InitialTF_{centre} = \sqrt[4]{(TF_0-1)(TF_1-1)(TF_2-1)(TF_3-1)} + 1 \quad \text{Equation 2}$$

Because the quad will be subdivided, this initial TF is 'halved' with the following approach, to produce the TF and BW (or blend factor) for the center.

IF $InitialTF_{center} < 2.0$
$TF_{center} := 1.0$
$BW_{center} := \text{BlendWeightFunc}(TF_0, TF_1, TF_2, TF_3)$
ELSE
$TF_{center} := InitialTF_{center}/2$
$BW_{center} := 1.0$
ENDIF Those skilled in the art will appreciate that calculation costs can be reduced if the tessellation factors are pre-modified (i.e. are pre-offset by −1.0). Further savings will be obtained by using (base two) logarithms, reducing the cost of the multiplications and roots.

Having determined the center vertex (in block 712), each input vertex, $V_0$, $V_1$, $V_2$, and $V_3$, is processed. In the example these will be done in the default sequential order, but it should soon be apparent that the order of processing these vertices is not critical and that they may be processed sequentially or in parallel.

A first input vertex $V_i$ is selected (block 714 from $\{V_0, V_1, V_2, V_3\}$ and this is used to define a vertex $W_i^0$ (block 716). The (u,v) coordinates of $V_i$ are duplicated to $W_i^0$, and a corresponding tessellation factor, $WTF_i^®$ and blend weight, $WBW_i^0$, are derived from the input $TF_i$ and $BW_i$ as follows:

IF $TF_i=1.0$
$WTF_i^0 := 1.0$
$WBW_i^0 := BW_i$
ELSE IF $TF_i < 2.0$
$WTF_i^0 := 1.0$
$WBW_i^0 := TF_i - 1.0$
ELSE
$WTF_i^0 := TF_i/2$
$WBW_i^0 := 1.0$

There are then three different actions which occur dependent upon the value of the input vertex $TF_i$ and the values of the vertex TFs of the next and previous neighboring vertices, i.e. $TF_{(i+1)mod4}$ and $TF_{(i-1)mod4}$ (as defined by the decisions in blocks 720-724). For example, as the vertices are labeled going around the quad a rotational order, if the selected vertex is $V_0$, i.e. i=0, the next and previous neighboring vertices are $V_1$ and $V_3$ respectively.

If input $TF_i$ is greater than one or if both neighbors have a vertex TF greater than one, i.e. $(TF_i>1)$ OR $((TF_{(i+1)mod4}>1)$ AND $(TF_{(i-1)mod4}>1))$ is TRUE ('Yes' in block 720), then each incoming edge (i.e. each edge between the selected vertex and a neighbor vertex) is sub-divided by the addition of new vertices, $W_i^1$ and $W_i^3$, the former subdividing edge $\overline{V_i V_{(i+1)mod4}}$ and the latter edge $\overline{V_{(i-1)mod4} V_i}$, and the vertex tessellation factor and blend factors for each newly added vertex is calculated (block 726). The sub-quad (i.e. the four vertices comprising $W_i^0$, $W_i^1$, $V_{Center}$ (which can be considered to be $W_i^2$), and $W_i^3$) is then input back into the method shown in FIG. 7 (block 728 and as indicated by the dotted arrow back to block 702).

The position and tessellation factor data for the new vertices, i.e. $W_i^1$ and $W_i^3$, are determined as follows. For brevity, let $V_M$ refer to a new vertex and let $V_A$ and $V_B$ refer to the vertices on either end of the edge that $V_M$ is subdividing. The vertex tessellation factor and blend weight of the $V_M$, i.e. $TF_M$ and $BW_M$, are determined in an analogous way to the center point, except that only two input vertices, rather than four, are used, i.e.

$$InitialTF_M = \sqrt[2]{(TF_A - 1)(TF_B - 1)} + 1 \quad \text{Equation 3}$$

IF $InitialTF_M < 2.0$ $TF_M := 1.0$ $BW_M := \text{MAX}(\text{MIN}(TF_A - 1, 1), \text{MIN}(TF_B - 1, 1))$

ELSE $TF_M := InitialTF_M/2$ $BW_M := 1.0$

ENDIF

The (u,v) position in domain space of VM is set to the average of (u,v) coordinates of $V_A$ and $V_B$. To prevent popping, the position in N-dimensional space of $V_M$ is given as a weighted blend, using $BW_M$ as the weight, of (i) the average of the N-dimensional positions of $V_A$ and $V_B$ and (ii) the final, N-dimensional position of mapped (U,V) coordinates of $V_M$. As before if $BW_M=0.0$, the blend should return (i), else if $BW_M=1.0$. it should return (ii), and values in between are interpolated accordingly.

Figure 9:
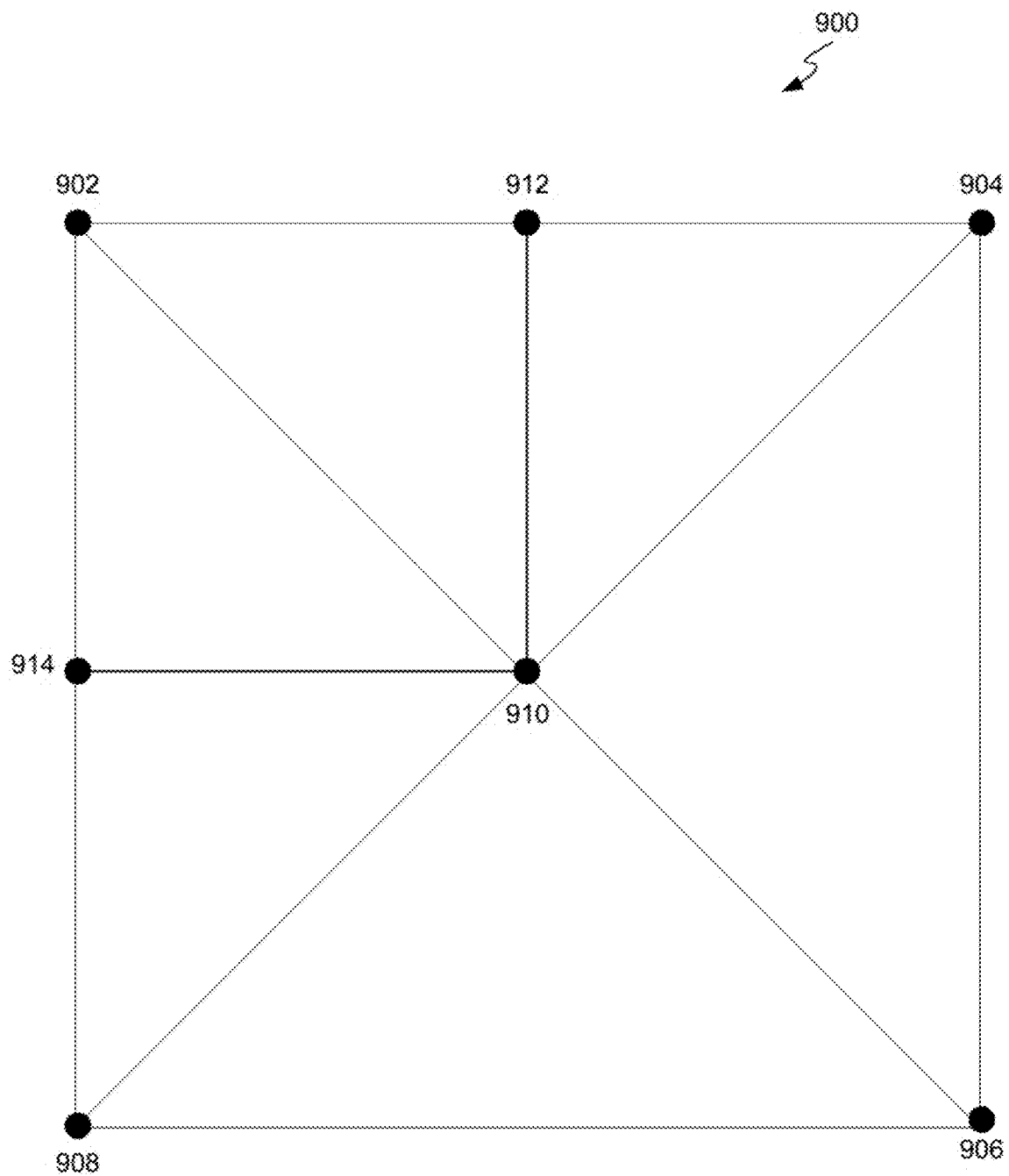
FIG. 9 is a schematic diagram illustrating the method of FIG. 7.

Referring to the quad 900 shown in FIG. 9, with vertex TFs of $TF_0=1.5$ (vertex 902), $TF_1=1.0$ (vertex 904), $TF_2=1.0$ (vertex 906) and $TF_3=1.0$ (vertex 908), as at least one vertex TF is not equal to one ('No' in block 702), a center vertex 910 is added (in block 712) and its initial vertex TF (before the 'halving') is calculated to be and post $$1.0\left(=\left(\sqrt[4]{0.5 \times 0 \times 0 \times 0}\right)+1\right),$$

and post 'halving' set to "1.0", (i.e. $TF_{center}:=1.0$), with a blend factor, $BF_{center}$, set to 0.5. As the center vertex may form the '$3^{rd}$' vertex in the sub-quad, it will also be referred to as $WV_0^2$, Vertex $V_0$ is selected (in block 714) and used to define a vertex $W_0^0$ (block 716). As the input vertex TF=1.5, the defined vertex will have $WTF_0^0=1.0$ and $WBW_0^0=0.5$. As the input vertex TF is greater than one ('Yes' in block 720), both incoming edges are sub-divided by the addition of two new vertices 912, 914 which form the remaining two vertices of the sub-quad ($W_0^1$ and $W_0^3$ respectively) and their vertex TFs are calculated using equation 2 above (block 726), such that $WTF_0^1=1.0$ and $WBW_0^1=0.5$ (vertex 912) and that $WTF_0^3=1.0$ and $WBW_0^3=0.5$ (vertex 914). The sub-quad, as defined by vertices 902, 912, 910 and 914 with their vertex TFs of $WTF_0=1.0$ (vertex 902), $WTF_0^1=1.0$ (vertex 912), $WTF_0^2=1.0$ (vertex 910) and $WTF_0^3=1.0$ (vertex 914) are then fed back into the start of the method, thus the sub-quad's $W_0$ becomes a "$V_0$", $W_1$ becomes $V_1$ etc.

Considering this new sub-quad, all the vertex TFs are equal to one ('Yes' in block 702) and the quad is not a top level patch ('No' in block 704) and so the quad is half-tessellated by dividing it into two triangles (block 710), i.e. two triangles are drawn, one which is formed by vertices 902, 912 and 910 and the other which is formed by vertices 902, 910 and 914. The edge which is common to both triangles connects $V_0$ and $V_2$, which was the center vertex of the parent quad (vertex 910).

Returning to the previous parent processing, if $((TF_i>1)$ OR $((TF_{(i+1)mod4}>1)$ AND $(TF_{(i-1)mod4}>1)))$ is FALSE ('No' in block 720), then the $TF_i$ must be equal to one. If the vertex TFs of both neighbors are also equal to one ('Yes' in block 722) the selected vertex is skipped and the next vertex in turn is selected (block 730) as any required tessellation will be implemented when other vertices in the quad are selected. This condition shown in the quad 900 of FIG. 9 when vertex 906 is the selected vertex: its vertex TF is not greater than one and both neighbor vertices (vertices 904 and 908) have vertex TFs equal to one.

If the input vertex TF is equal to one and both neighbors do not have vertex TFs that are also equal to one ('No' in both blocks 720 and 722) then exactly one neighbor must have a vertex TF which is greater than one ('Yes' in block 724), although, as this is guaranteed as a result of the 'No' in both blocks 720 and 722, it is not necessary to test for this condition and block 724 can be omitted. When exactly one neighbor has a vertex TF which is greater than one, there are two possibilities: either it is the next neighbor ('Yes' in block 732) or the previous neighbor ('No' in block 732).

In the event that it is the next neighbor that has a vertex TF which is greater than one ('Yes' in block 732), the edge between the selected vertex and the next neighbor is sub-divided (block 734) using the same expressions used to create a $V_M$ case as described previously, i.e. by the addition of a new vertex at a position in domain space which is given by the mean of the positions of the selected vertex and the next neighbor vertex, and with TF, BW and N-dimensional positions as described previously (see equation 3 and following text). This forms a sub-quad comprising the selected vertex, the newly added vertex, the center vertex and the previous vertex. This sub-quad is half-tessellated by connecting the selected vertex to the diagonally opposite vertex (block 736). The method then selects the next vertex in the parent quad (block 730), e.g. $V_1$, and the method repeats (as indicated by the arrow back to block 716).

This is shown in the quad 900 of FIG. 9 when vertex 908 is the selected vertex. The selected vertex 908 has a vertex TF of one, the previous vertex (vertex 906) also has a vertex TF of one and the next vertex (vertex 902) has a vertex TF greater than one ('No' in blocks 720 and 722 and 'Yes' in blocks 724 and 732). Consequently, the edge to the next vertex is sub-divided by the addition of vertex 914 and a half-tessellated sub-quad (defined by vertices 908, 914, 910, 906) is formed by drawing two triangles: one which is formed by vertices 908, 914 and 910 and the other which is formed by vertices 908, 910 and 906. The edge which is common to both triangles connects the selected vertex (vertex 908) and the center vertex of the parent quad (vertex 910).

In the event that it is the previous neighbor that has a vertex TF which is greater than one ('No' in block 732), the edge between the selected vertex and the previous neighbor is sub-divided (block 738) using the same expressions used to create a $V_M$ case as described previously, i.e. by the addition of a new vertex at a position in domain space which is given by the mean of the positions of the selected vertex and the previous neighbor vertex, and with TF, BW and N-dimensional positions as described previously (see equation 3 and following text). This forms a sub-quad comprising the selected vertex, the next vertex, the center vertex and the newly added vertex. This sub-quad is half-tessellated by connecting the selected vertex to the diagonally opposite vertex (block 736). The method then selects the next vertex in the parent quad (block 730), e.g. $V_1$, and the method repeats (as indicated by the arrow back to block 716).

This is shown in the quad 900 of FIG. 9 when vertex 904 is the selected vertex. The selected vertex 904 has a vertex TF of one, the next vertex (vertex 906) also has a vertex TF of one and the previous vertex (vertex 902) has a vertex TF greater than one ('No' in blocks 720 and 722, 'Yes' in block 724 and 'No' in block 732). Consequently, the edge to the previous vertex is sub-divided by the addition of vertex 912 and a half-tessellated sub-quad (defined by vertices 904, 906, 910, 912) is formed by drawing two triangles: one which is formed by vertices 904, 910 and 912 and the other which is formed by vertices 904, 906 and 910. The edge which is common to both triangles connects the selected vertex (vertex 904) and the center vertex of the parent quad (vertex 910).

Figure 10:
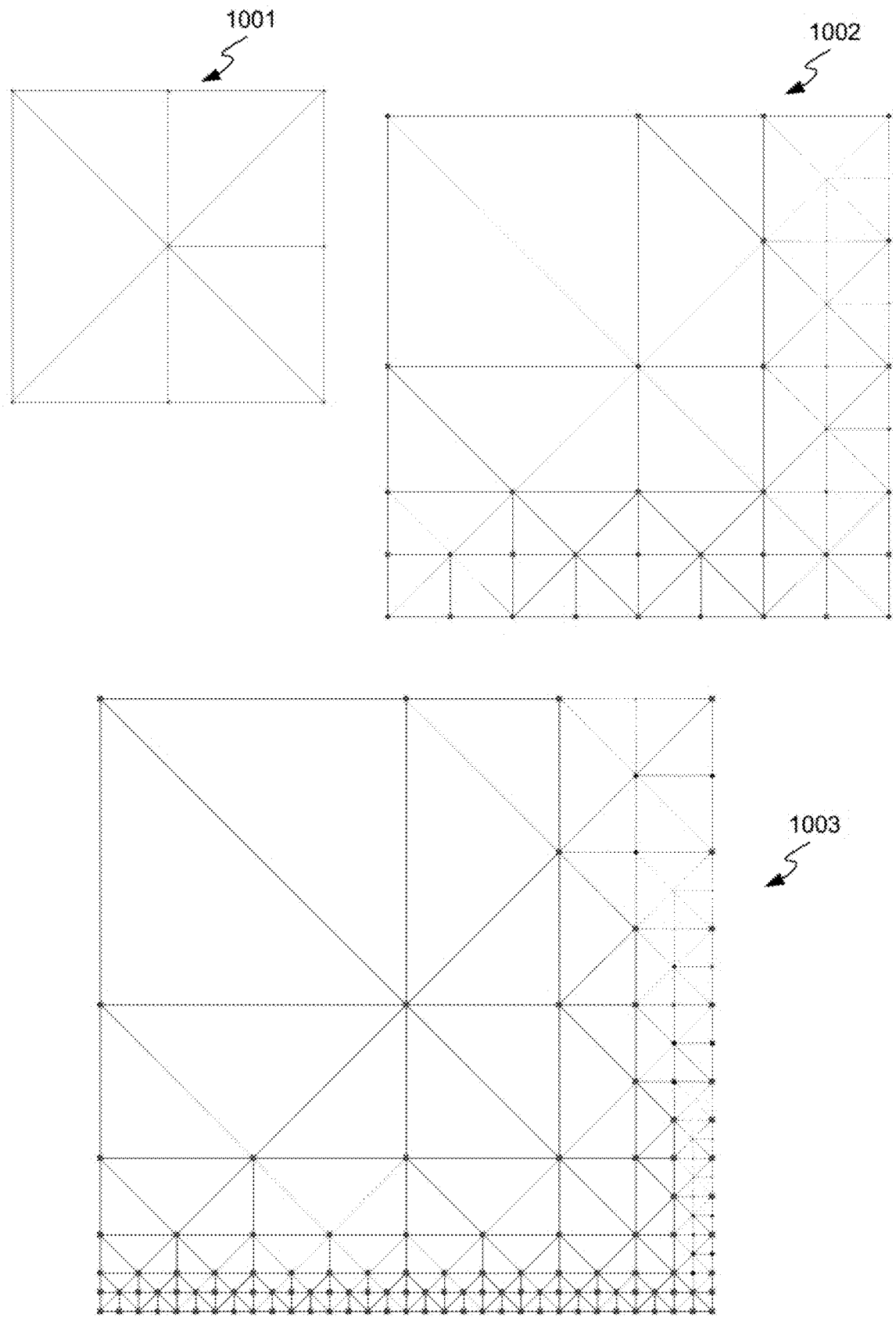
FIG. 10 shows examples of the results obtained using the method of FIG. 7.

FIG. 10 shows three examples of tessellated quads obtained using the method shown in FIG. 7. The first example 1001 shows vertex tessellation factors of $TF_0=1$, $TF_1=2$, $TF_2=2$, $TF_3=1$. The second example 1002 shows vertex tessellation factors of $TF_0=2$, $TF_1=4$, $TF_2=8$, $TF_3=8$. The third example 1003 shows vertex tessellation factors of $TF_0=3$, $TF_1=5$, $TF_2=32$, $TF_3=32$.

It should be apparent to one skilled in the art that, although the examples previously may have described, as the quad vertices are selected in turn, computing 'new vertices' that subdivide edges, each newly added vertex may be shared between 2 sub-quads of a parent quad and thus computation can be reduced by computing these before iterating through the parent quad's children. For example, referring to the third example 1003 in FIG. 10, the vertices which divide each edge of the top level quad may be computed before iterating through the top level quad's children—the top-left sub-quad (which is ultimately divided into two triangles), top-right sub-quad (which is ultimately divided into 26 triangles), bottom-right sub-quad and bottom-left sub-quad.

Further savings can be made where two parent quads share the same edge and thus may both compute the same 'subdividing new vertices'. A simple cache/buffer/addressable memory indexed with, for example, the (u,v) parameters may be used to store the vertex data and hence reduce re-computation overhead. Where such a store of vertex data is used, it may be checked prior to calculating the new TF and BW for a newly added vertex and if a vertex with the same (u,v) parameters is stored, the TF and BW for that stored vertex may be used instead of re-calculating the values. In various examples, the store of vertex data may only store a limited number of vertices (rather than all previously added vertices) and even in such examples, the amount of recomputation may be significantly reduced.

The triangle method (of FIG. 8) can be described with reference to the example triangles 1101-1104 shown in FIG. 11. The triangle method receives three vertices, each comprising a domain space (i.e. (u,v)) coordinate and a vertex tessellation factor. If all three vertex tessellation factors equal one ('Yes' in block 802), then no sub-division is performed. This is shown in the first example triangle 1101 in FIG. 1.

If at least one of the three vertex tessellation factors does not equal one ('No' in block 802), i.e. at least one of the three vertex tessellation factors is greater than one, a center vertex is added to the triangle and a vertex tessellation factor is calculated for the newly added center vertex (block 804). The center vertex which is added (in block 804) is added at a position in domain space which is the mean of the three vertices. The vertex tessellation factor of the center vertex is calculated in a similar fashion to the quad case, except adapted to 3 vertices i.e.

$$InitialTF_{centre} = \sqrt[3]{(TF_0-1).(TF_1-1).(TF_2-1)} + 1 \qquad \text{Equation 4}$$

IF $InitialTF_{center} < 2.0$ $TF_{center} := 1.0$ $BW_{center} := BlendWeightFunc\,(TF_0, TF_1, TF_2)$

ELSE $TF_{center} := InitialTF_{center}/2$ $BW_{center} := 1.0$

ENDIF where the three vertices are denoted $V_0$-$V_2$ and their vertex tessellation factors are denoted $TF_0$-$TF_2$.

Having created the center vertex (in block 804), a first vertex $V_i$ (e.g. $V_0$) is selected (block 806). For a triangle (which is always an input patch), any vertex may be labeled as $V_0$ and then the remaining vertices are labeled in order going around the triangle in a clockwise or counter-clockwise order. Whichever direction is used for labeling the vertices (i.e. clockwise or counter-clockwise), the same order must be used throughout the tessellation method and for the purposes of the following description, a clockwise labeling convention is adopted.

The selected vertex $V_i$ is used to define a vertex $W_i^0$ (block 808) in a similar manner to the quad method described above. The (u,v) coordinates of $V_i$ are duplicated to $W_i^0$, and a corresponding tessellation factor, $WTF_i^0$ and blend weight, $WBW_i^0$, are derived from the input $TF_i$ and $BW_i$ as follows:

IF $TF_i=1.0$
$WTF_i^0 := 1.0$
$WBW_i^0 := BW$
ELSE IF $TF_i<2.0$
$WTF_i^0 := 1.0$
$WBW_i^0 := TF_i-1.0$
ELSE
$WTF_i^0 := TF_i/2$
$WBW_i^0 := 1.0$

In a similar manner to the quad method of FIG. 7, there are then three different actions which occur dependent upon the value of the input vertex $TF_i$ and the values of the vertex TFs of the next and previous neighboring vertices i.e.

$TF_{(i+1)mod3}$ and $TF_{(i-1)mod3}$ (as defined by the decisions in blocks 812-816). As the vertices are labeled going around the triangle in a rotational order, if the selected vertex is $V_0$ (such that i=0), the neighboring vertices are the next vertex, $V_1$, and the previous vertex $V_2$.

If the input vertex TF is greater than one ('Yes' in block 812), then each incoming edge (i.e. each edge between the selected vertex and a neighbor vertex) is sub-divided by the addition of a new vertices, $W_i^1$ and $W_i^3$, the former subdividing edge $\overline{V_l V_{(l+1)mod3}}$ and the latter edge $\overline{V_{(l-1)mod3} V_l}$, and the vertex tessellation factor and blend factors for each newly added vertex is calculated (block 818). The sub-quad (i.e. the four vertices comprising $W_i^0$, $W_i^1$, $V_{center}$ (which can be considered to be $W_i^2$), and $W_i^3$) is then input to the quad method shown in FIG. 7 (block 820 i.e. starting at block 702).

The position and tessellation factor data for the new vertices, i.e. $W_i^1$ and $W_i^3$, are determined as described above for the quad case, i.e.:

$$InitialTF_M = \sqrt[2]{(TF_A - 1)(TF_B - 1)} + 1 \quad \text{Equation 3}$$

IF $InitialTF_M < 2.0$ $TF_M := 1.0$ $BW_M := \text{MAX}(\text{MIN}(TF_A - 1, 1), \text{MIN}(TF_B - 1, 1))$

ELSE $TF_M := InitialTF_M/2$ $BW_M := 1.0$

ENDIF

The (u,v) position in domain space of $V_M$ is set to the average of (u,v) coordinates of $V_A$ and $V_B$. To prevent popping, the position in N-dimensional space of $V_M$ is given as a weighted blend, using $BW_M$ as the weight, of (i) the average of the N-dimensional positions of $V_A$ and $V_B$ and (ii) the final, N-dimensional position of mapped (U,V) coordinates of $V_M$. As before if $BW_M=0.0$, the blend should return (i), else if $BW_M=1.0$. it should return (ii), and values in between are interpolated accordingly.

This can be illustrated with reference to the second example triangle 1102 in FIG. 11, with vertex TFs of $TF_0>1.0$ (vertex 1106), $TF_1=1.0$ (vertex 1108), and $TF_2=1.0$ (vertex 1110). All the vertex TFs are not equal to one ('No' in block 802), so a center vertex 1112 is generated (in block 804) and its vertex TF and blend factor is calculated using equation 4 above. Vertex $V_0$ is selected (in block 806) and a vertex $W_i^0$ is defined (in block 808). As the input vertex TF is greater than one ('Yes' in block 812), both incoming edges are sub-divided by the addition of two new vertices 1114, 1116 and their vertex TFs and blend factors are calculated as described above (block 818). The sub-quad, as defined by vertices 1106, 1114, 1112 and 1116 with their vertex TFs and blend factors (as calculated in blocks 808 and 818) are then fed into the quad method (block 820, i.e. into block 702 of FIG. 7).

Returning to the previous parent processing, if the input vertex TF is not greater than one ('No' in block 812), then the input vertex TF must be equal to one. If the vertex TFs of both neighbors are both greater than one ('Yes' in block 814), each incoming edge is sub-divided (i.e. each edge between the selected vertex and a neighbor vertex) by the addition of a new vertex (block 822) using the same expressions used to create a $V_M$ case as described previously, i.e. by the addition of a new vertex at a position in domain space which is given by the mean of the positions of the selected vertex and the next neighbor vertex, and with TF, BW and N-dimensional positions as described previously (see equation 3 and following text). This forms a sub-quad comprising the selected vertex, the newly added vertex between the selected vertex and the next vertex, the center vertex and the newly added vertex between the selected vertex and the previous vertex. This sub-quad is half-tessellated by connecting the selected vertex to the diagonally opposite vertex (block 824). The method then selects the next vertex in the parent triangle (block 826), e.g. $V_1$, and the method repeats (as indicated by the arrow back to block 808).

This can be illustrated with reference to the third example triangle 1103 in FIG. 11, with vertex TFs of $TF_0=1.0$ (vertex 1120), $TF_1>1.0$ (vertex 1122), and $TF_2>1.0$ (vertex 1124). All the vertex TFs are not equal to one ('No' in block 802), so a center vertex 1126 is generated (in block 804) and its vertex TF and blend factors are calculated using equation 4 above. Vertex $V_0$ is selected (in block 806) and used to generate a vertex $W_i^0$ (in block 808). As the input vertex TF is not greater than one ('No' in block 812) but the vertex TFs of both neighbors are greater than one ('Yes' in block 814), both incoming edges are sub-divided by the addition of two new vertices 1128, 1130 which form the remaining two vertices of the sub-quad ($W_i^1$ and $W_i^3$ respectively). The sub-quad, as defined by vertices 1120, 1128, 1126 and 1130 is half-tessellated by drawing two triangles (in block 824): one which is formed by vertices 1120, 1128 and 1126 and the other which is formed by vertices 1120, 1126 and 1130. The edge which is common to both triangles connects $W_i^0$ (vertex 1120) and $W_i^2$ which is the center vertex of the triangle (vertex 1126).

If the input vertex TF is equal to one and both neighbors do not have vertex TFs that are greater than one ('No' in both blocks 812 and 814) then exactly one neighbor must have a vertex TF which is greater than one ('Yes' in block 816), although, as this is guaranteed as a result of the 'No' in both blocks 812 and 814, it is not necessary to test for this condition and block 816 can be omitted. When exactly one neighbor has a vertex TF which is greater than one, there are two possibilities: either it is the next neighbor ('Yes' in block 828) or the previous neighbor ('No' in block 828).

In the event that it is the next neighbor that has a vertex TF which is greater than one ('Yes' in block 828), the edge between the selected vertex and the next neighbor is sub-divided (block 830) using the same expressions used to create a $V_M$ case as described previously, i.e. by the addition of a new vertex at a position in domain space which is given by the mean of the positions of the selected vertex and the next neighbor vertex, and with TF, BW and N-dimensional positions as described previously (see equation 3 and following text). A single triangle is then formed, the triangle comprising the selected vertex, the newly added vertex and the center vertex (block 832). The method then selects the next vertex in the triangle (block 826), e.g. $V_1$, and the method repeats (as indicated by the arrow back to block 808).

Figure 11:
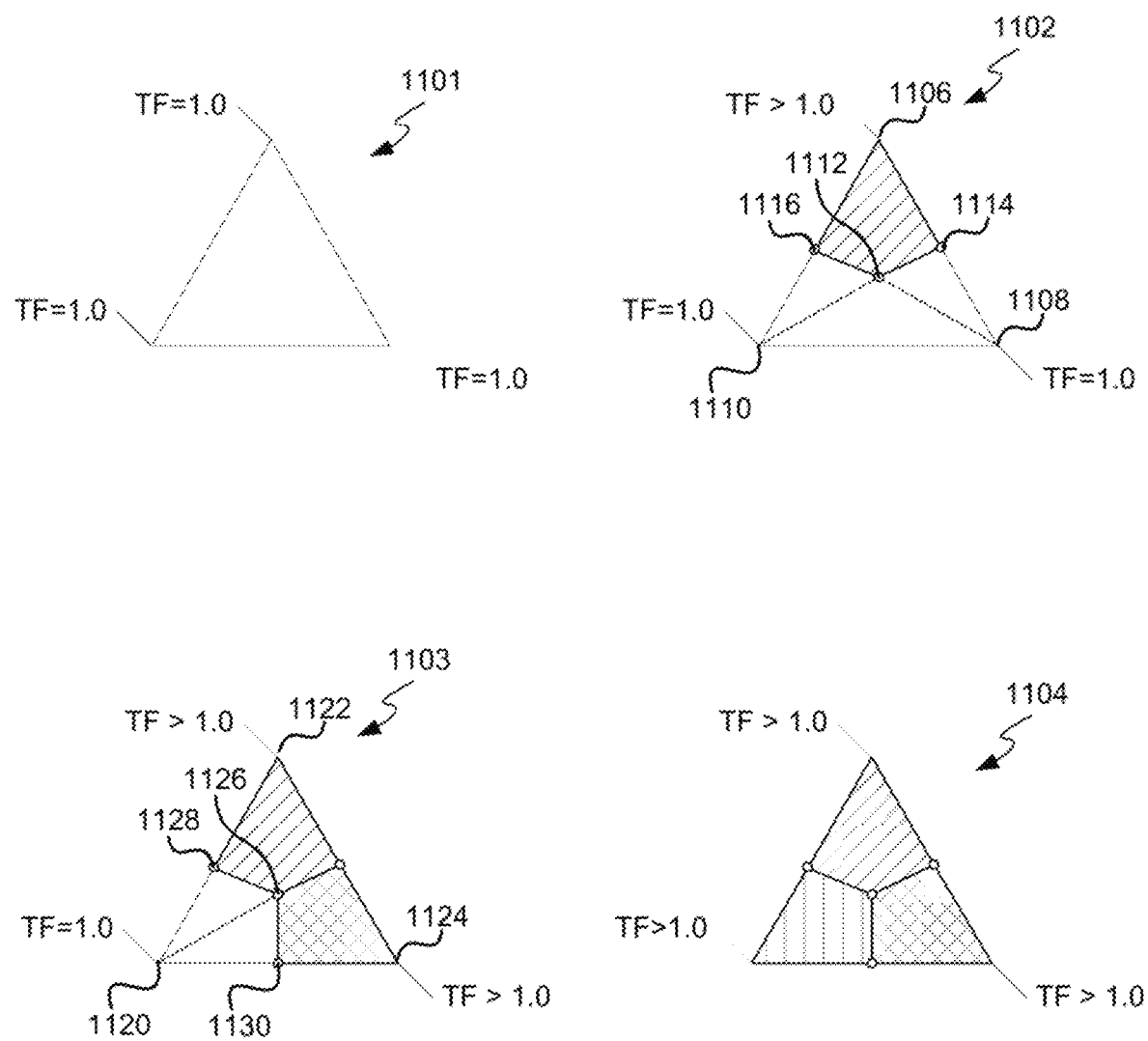
FIG. 11 is an example schematic diagram illustrating the method of FIG. 8.

This is shown in the second example triangle 1102 in FIG. 11 when vertex 1110 is the selected vertex. The selected vertex 1110 has a vertex TF of one, the previous vertex (vertex 1108) also has a vertex TF of one and the next vertex (vertex 1106) has a vertex TF greater than one ('No' in blocks 812 and 814 and 'Yes' in blocks 816 and 828). Consequently, the edge to the next vertex is sub-divided by the addition of vertex 1116 and a single triangle is formed by vertices 1110, 1116 and 1112 (the center vertex, added in block 804).

In the event that it is the previous neighbor that has a vertex TF which is greater than one ('No' in block 828), the edge between the selected vertex and the previous neighbor is sub-divided (block 834) using the same expressions used to create a $V_M$ case as described previously, i.e. by the addition of a new vertex at a position in domain space which is given by the mean of the positions of the selected vertex and the previous neighbor vertex, and with TF, BW and N-dimensional positions as described previously (see equation 3 and following text). This forms a sub-quad comprising the selected vertex, the next vertex, the center vertex and the newly added vertex. This sub-quad is half-tessellated by connecting the selected vertex to the diagonally opposite vertex (block 836). The method then selects the next vertex in the parent quad (block 826), e.g. $V_1$, and the method repeats (as indicated by the arrow back to block 808).

This is shown in the second example triangle 1102 in FIG. 11 when vertex 1108 is the selected vertex. The selected vertex 1108 has a vertex TF of one, the next vertex (vertex 1110) also has a vertex TF of one and the previous vertex (vertex 1106) has a vertex TF greater than one ('No' in blocks 812 and 814, 'Yes' in block 816 and 'No' in block 828). Consequently, the edge to the previous vertex is sub-divided by the addition of vertex 1114 and a half-tessellated sub-quad (defined by vertices 1108, 1110, 1112, 1114) is formed by drawing two triangles: one which is formed by vertices 1108, 1112 and 1114 and the other which is formed by vertices 1108, 1110 and 1112. The edge which is common to both triangles connects the selected vertex (vertex 1108) and the center vertex of the triangle (vertex 1112).

Figure 12:
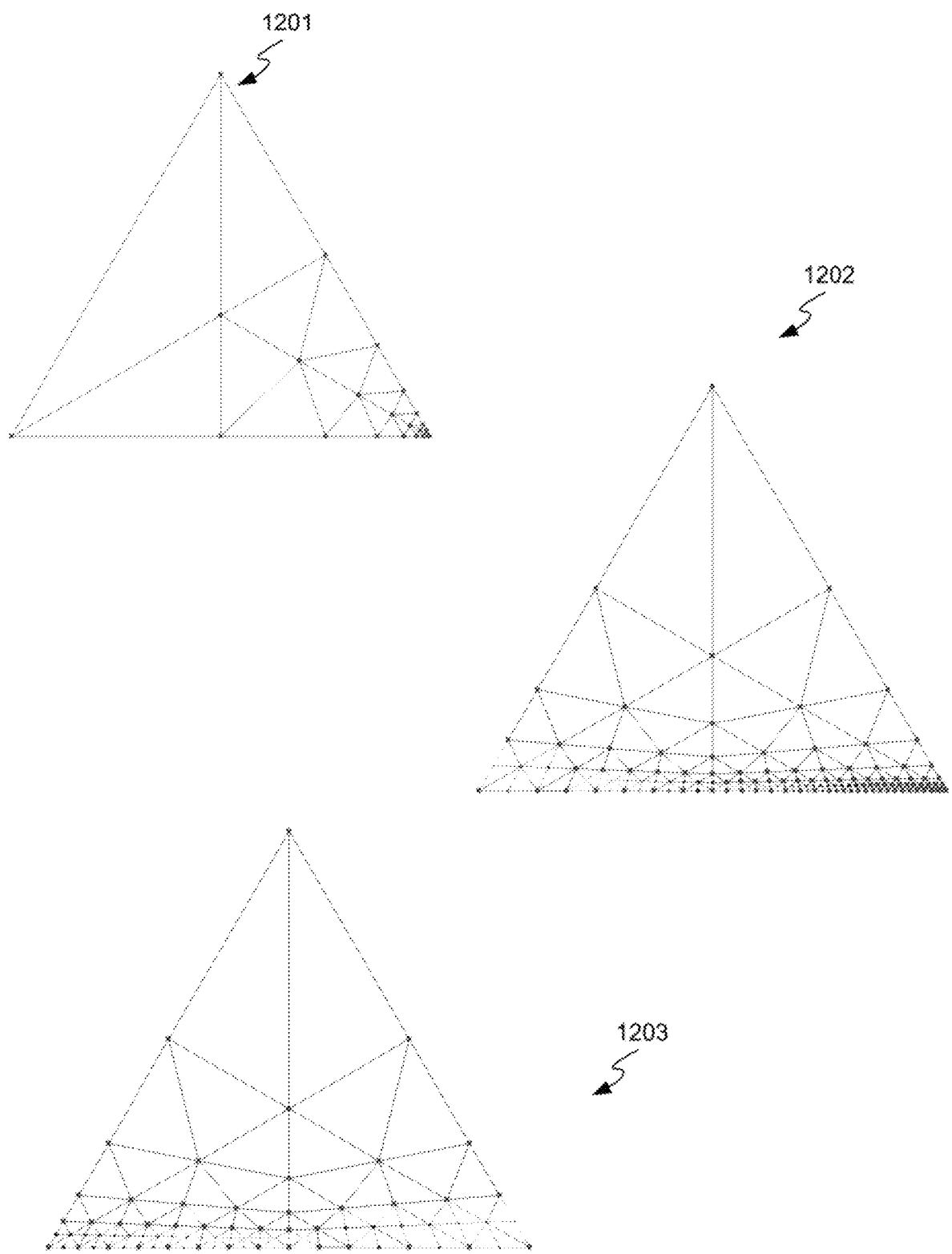
FIG. 12 shows examples of the results obtained using the methods of FIGS. 7 and 8.
Figure 15:
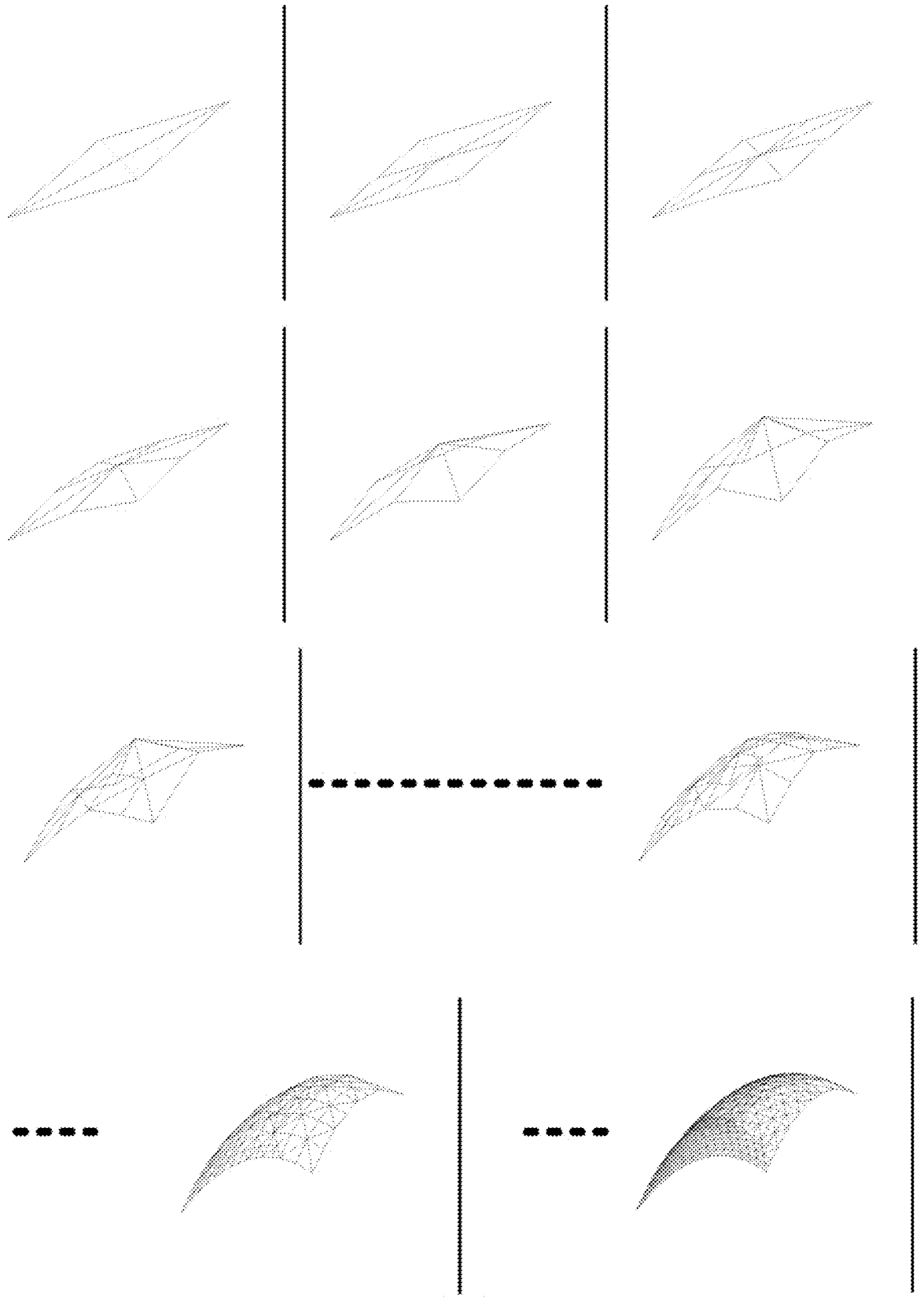
FIG. 15 shows further examples of the results obtained using the methods of FIGS. 7 and 8.

FIG. 12 shows three examples of tessellated triangles obtained using the methods shown in FIGS. 7 and 8. The first example 1201 shows vertex tessellation factors of $TF_0=1$, $TF_1=100$, $TF_2=1$. The second example 1202 shows vertex tessellation factors of $TF_0=1$, $TF_1=100$, $TF_2=10$. The third example 1203 shows vertex tessellation factors of $TF_0=50$, $TF_1=10$, $TF_2=30$. Further examples are shown in FIG. 15 which comprises a sequence of wireframe tessellations in 3D (it will be appreciated that the final tessellation system described herein can be applied to N dimensions). The examples shown in FIG. 15 show the changes as the vertex tessellation factors change from (1,1,1,1) through to approximately (26.5, 16.7, 8.8, 4.9).

Although the tessellation method is described above (and shown in FIGS. 7 and 8) as involving comparisons between vertex tessellation factors and a value of one (in blocks 702, 720-724, 730, 802, 812-816 and 828), in a variation on the methods described the comparisons may be performed with respect to a different threshold value (i.e. for a threshold which is not equal to one, in which case the tests to determine if further subdivision is required may be based on whether the tessellation factor is strictly greater than the threshold). This variation may be chosen in order to reduce the number of triangles generated in the tessellation process but can reduce the smoothness of animation as LODs change.

Furthermore, although particular equations are used above to calculate values of tessellation factors and blend factors for newly added vertices, in other examples, different equations may be used. For example, instead of using equation 2, the following equation may be used:

$$TF_{centre} = \sqrt[4]{TF_0.TF_1.TF_2.TF_3} \qquad \text{Equation 2A}$$

And instead of using equation 3, the following equation may be used:

If $TF_i \neq 1$ and $TF_{neighbour} \neq 1$, 　　　　Equation 3A $$\text{then } TF_M = \frac{\left(\sqrt[2]{TF_i.TF_{neighbour}}\right)}{2}$$

If $TF_i = 1$ or $TF_{neighbour} = 1$, then $TF_M = 1$

And instead of using equation 4, the following equation may be used:

$$TF_{centre} = \sqrt[3]{TF_0.TF_1.TF_2} \qquad \text{Equation 4A}$$

As shown in the examples provided, by using the tessellation method described above which uses vertex TFs instead of edge TFs, the resulting triangles are more evenly sized and T-junctions (which can cause cracks in the resultant rendered image) are avoided. Where the level of detail changes within a scene, the transition is handled smoothly (e.g. with the size of triangles and spacing of vertices changing gradually) and abrupt transitions (which can cause unwanted visual artifacts) are avoided. Similarly, where the level of detail changes over time (e.g. as an object gets closer or further away from the viewpoint), the transitions are smooth and the likelihood of unwanted visual artifacts due to the moving of vertices is avoided as each vertex is created at its final position in parametric space. Known techniques can be used in the depth (or height) direction (e.g. blending) to gradually introduce these new vertices (e.g. so that they appear to 'grow out' of a surface gradually).

The methods of tessellating quads and triangles (as shown in FIGS. 7 and 8) are rotationally invariant, such that a patch will be sub-divided into triangles in the same way irrespective of its orientation within the scene. This may, for example, be particularly important so that a rotating object in the scene does not produce unwanted visual artifacts when rendered. Furthermore, it is not important which vertex of an input patch (e.g. quad or triangle) the method starts with because the same result is achieved in all cases.

The vertex TFs that are input to the tessellation method may be generated by a separate application (e.g. based on the distance of the viewer from each vertex, for example the vertex TF for a vertex may be proportional to the reciprocal of the distance of the vertex from the eye). In various examples, an API may be provided which converts edge TFs into vertex TFs (e.g. by taking averages of all the edge TFs for edges which meet at the vertex) before inputting them into the methods described herein.

Although the description of the tessellation method above refers to the use of recursion, it will be appreciated that the method may alternatively be implemented iteratively and/or in parallel instead of recursively and any reference to 'recursion' or 'iteration' in the description is by way of example only.

The tessellation methods described above have been applied to triangular and quadrilateral domains, but, as the initial domain subdivision involved traversing the 3 or 4-sided polygonal domain a vertex at time to produce sub-quads, one skilled in the art will appreciate that the process can be applied equally well to any N-sided domain, e.g. pentagonal or hexagonal, to create sub-quads and, thereafter, continue recursively with any generated sub-quads.

Figure 16:
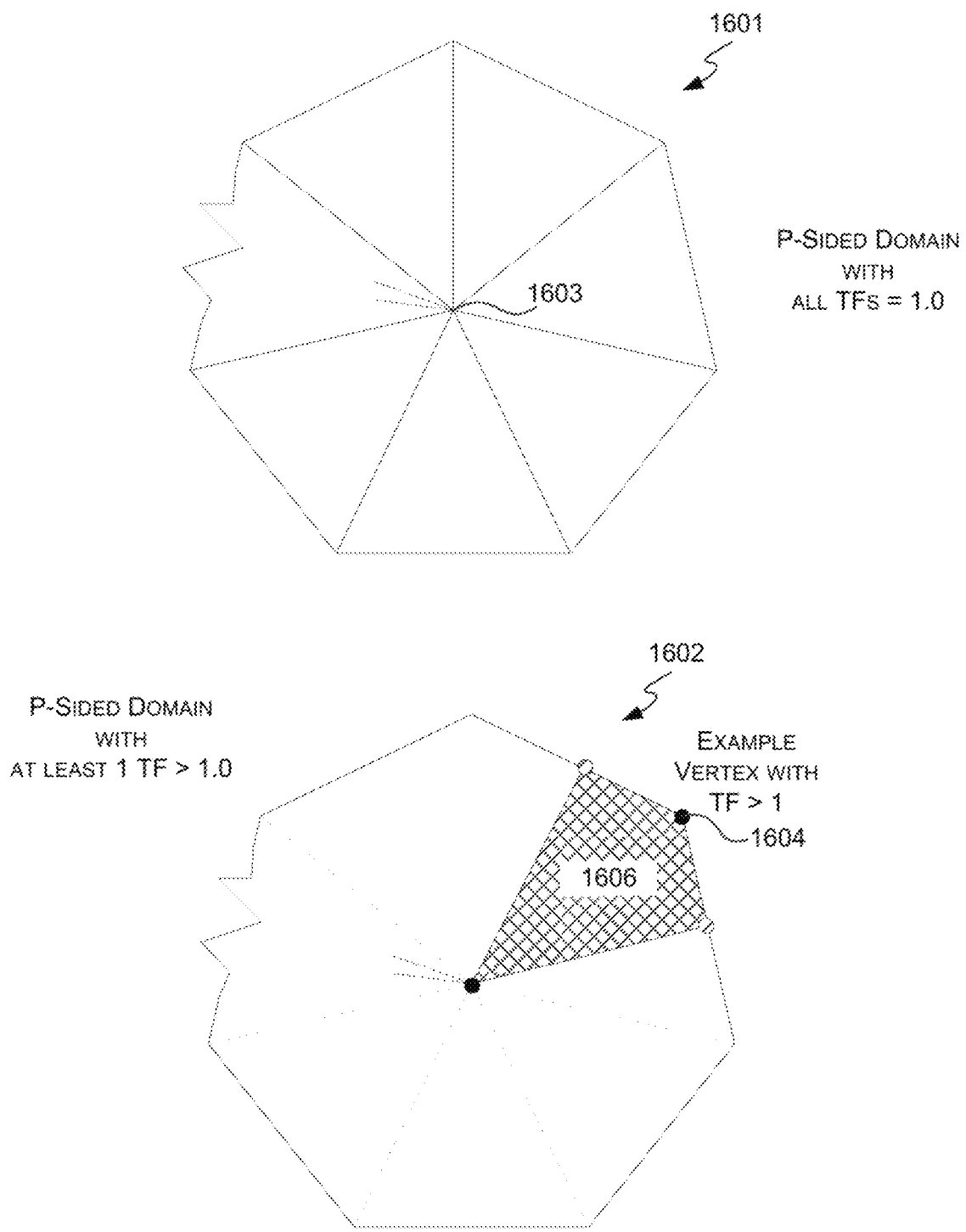
FIG. 16 is a schematic diagram illustrating how the methods described herein can be extended to P-sided domains.

With reference to FIG. 16, consider a P-sided domain, where P≥4. If the tessellation factors, $TF_i$, for all P vertices are equal to 1 (as in the first example 1601) then in a similar fashion to the quad case, a center vertex 1603 is added at a position in the final N-dimensional space, which is the average of the P vertices' N-dimensional locations. P triangles are then generated by connecting $V_i$, $V_{i+1 mod P}$ and the added center vertex, for each i, 0≤i<P.

If at least one tessellation factor exceeds 1 (as in the second example 1602) then the process described previously for the quad tessellation is applied except that, a) the blend weight function (in equation 1 above) is generalized to:

BlendWeightFunc=MAX$_{i=0 \ldots P-1}$(MIN($TF_i$-1,1))

b) The function for the initial TF for the center (in equation 2 above) is generalized to:

$$InitialTF_{centre} = \sqrt[P]{(TF_0 - 1)(TF_1 - 1) \ldots (TF_{P-1} - 1)} + 1$$

c) The indexing of previous and next vertices becomes, $V_{(i-1)MOD\ P}$ and $V_{(i+1)MOD\ P}$ respectively.

For example, following the method for the quad described above (and shown in FIG. 7), if the selected vertex, $V_i$, has a tessellation factor, $TF_i$, >1.0 (e.g. vertex 1604), then the two incoming edges are subdivided to create two additional vertices, and a sub-quad 1606 defined from the updated selected vertex, one of the additional vertices, the center vertex and the remaining additional vertex. This sub-quad can then be provided as a further input to the method of FIG. 7 (e.g. as an input to block 702).

The tessellation methods described above which use vertex tessellation factors (e.g. as described with reference to FIGS. 7 and 8) may be used to perform tessellation on-the-fly (e.g. as the viewpoint changes within a 3D scene) or alternatively the methods may be used offline to pre-compute triangles for a number of different viewpoints.

Figure 13:
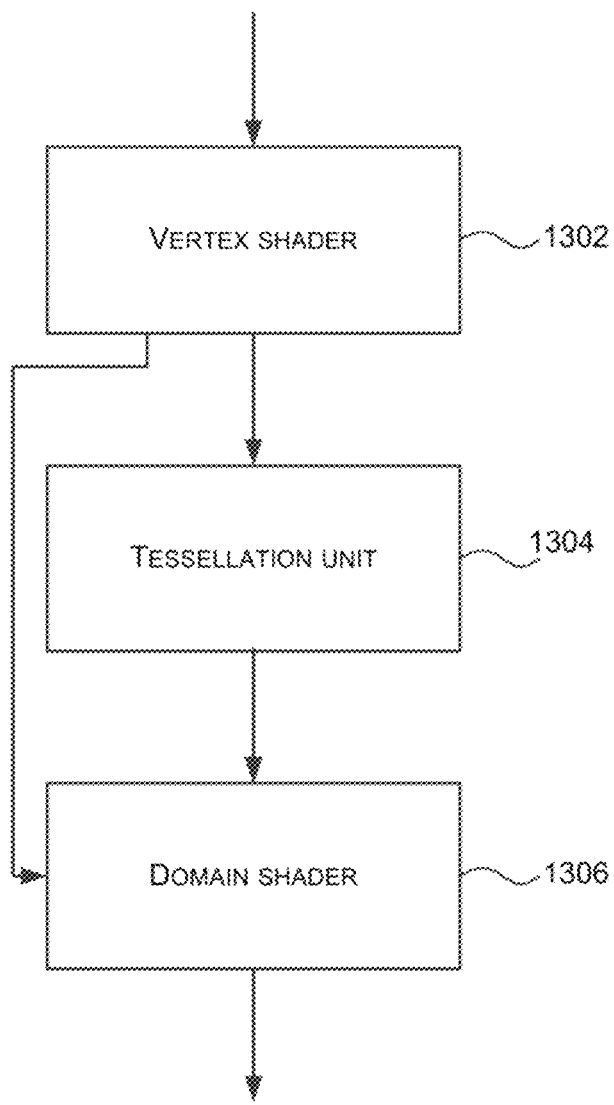
FIG. 13 is a schematic diagram of an example GPU pipeline.

The tessellation methods described above which use vertex tessellation factors (e.g. as described with reference to FIGS. 7 and 8) may be implemented in hardware. In various examples, the methods may be implemented in a hardware tessellation unit within a graphics processing unit (GPU) as shown in FIG. 13. FIG. 13 shows a schematic diagram of an example GPU pipeline 1300 which may be implemented in hardware within a GPU. As shown in FIG. 13, the pipeline 1300 comprises a vertex shader 1302 which is responsible for performing per-vertex calculations, including calculating vertex tessellation factors for all of these vertices (e.g. as a function of the vertex's position from the camera). Prior to calculating the vertex TF the vertex shader transforms the vertex into world space and may apply one or more other linear transforms. The vertex shader 1302 has no knowledge of the mesh topology and only knows the current vertex that has been fed into it.

Between the vertex shader 1302 and the hardware tessellation unit (or tessellator) 1304 (or between the vertex shader and an optional hull shader, not shown in FIG. 13, where the pipeline 1300 comprises one or more optional Hull Shaders between the vertex shader 1302 and the tessellator 1304) a patch (i.e. an ordered set of vertices) is built using the Topology. This patch information is passed to the hull shader (where provided). The tessellator 1304, however, only takes the vertex TFs and the rest of the patch information is passed onto the domain shader 1306.

The hardware tessellation unit (or tessellator) 1304 comprises hardware logic to implement the methods described above (e.g. as shown in FIGS. 7 and 8) using the received vertex TFs. Unlike the vertex shader, the hardware tessellation unit (and any optional Hull Shaders) operates per-patch and not per-vertex. In order to simplify the hardware required to implement the equations for calculating new vertex TFs (e.g. in blocks 718 and 810), the calculations may be performed in log 2 and so can be implemented as additions and subtractions (otherwise multiplications and divisions would be used). The hardware tessellation unit 1304 may be configured to perform aspects of the methods described above in parallel (e.g. the recursions on different patches). The hardware tessellation unit 1304 outputs the domain space coordinate for each new vertex and passes it onto the domain shader 1306 (e.g. by storing, in a buffer, details of every triangle formed).

The domain shader 1306 acts as a second vertex shader for vertices produced by the tessellator 1304 and is executed once per vertex generated by the tessellator. The domain shader supplies a domain space location (u,v) and gives all patch information and outputs a full vertex structure. The domain shader uses the patch control points and the domain space coordinates to build the new vertices and applies any displacement mapping (e.g. by sampling some bump or height map encoded in a texture).

After the domain shader 1306 has run for each generated vertex of each patch, the vertices are passed on to the rasterizer (not shown in FIG. 13). In tandem, primitives (in the form of index buffers) are passed from the tessellator to the rasterizer.

The GPU pipeline 1300 of FIG. 13 is shown by way of example only and the tessellation method described herein which uses vertex TFs can be used in any GPU architecture. It will also be appreciated that the hardware tessellation unit 1304 may be used in a GPU pipeline which comprises other shaders in addition to, or instead of, a vertex shader 1302, an optional hull shader and a domain shader 1306.

Figure 14:
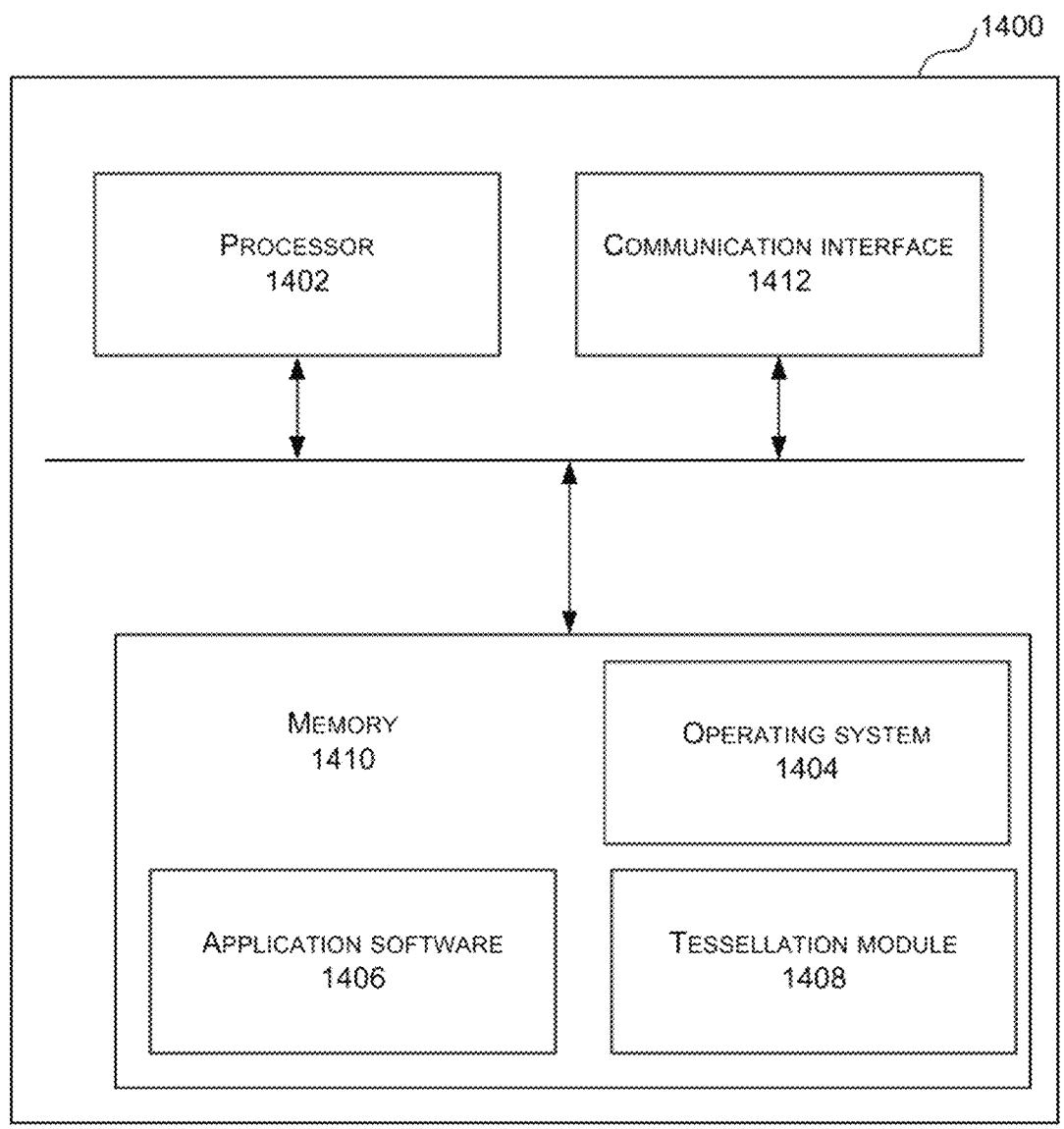
FIG. 14 illustrates various components of an exemplary computing-based device which may be implemented as any form of a computing and/or electronic device, and which may be configured to implement the tessellation methods of FIGS. 7 and 8.

The tessellation methods described above which use vertex tessellation factors (e.g. as described with reference to FIGS. 7 and 8) may alternatively be implemented in software (or a combination of software and hardware). FIG. 14 illustrates various components of an exemplary computing-based device 1400 which may be implemented as any form of a computing and/or electronic device, and which may be configured to implement the tessellation methods described above.

Computing-based device 1400 comprises one or more processors 1402 which may be microprocessors, controllers or any other suitable type of processors for processing computer executable instructions to control the operation of the device in order to perform the tessellation methods described above (e.g. as described with reference to FIGS. 7 and 8). In some examples, for example where a system on a chip architecture is used, the processors 1402 may include one or more fixed function blocks (also referred to as accelerators) which implement a part of the method of tessellation in hardware (rather than software or firmware). Platform software comprising an operating system 1404 or any other suitable platform software may be provided at the computing-based device to enable application software 1406 to be executed on the device and the application software may include a tessellation module 1408.

The computer executable instructions may be provided using any computer-readable media that is accessible by computing based device 1400. Computer-readable media may include, for example, computer storage media such as memory 1410 and communications media. Computer storage media (i.e. non-transitory machine readable media), such as memory 1410, includes volatile and non-volatile, removable and non-removable media implemented in any method or technology for storage of information such as computer readable instructions, data structures, program modules or other data. Computer storage media includes, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transport mechanism. As defined herein, computer storage media does not include communication media. Although the computer storage media (i.e. non-transitory machine readable media, e.g. memory 1410) is shown within the computing-based device 1400 it will be appreciated that the storage may be distributed or located remotely and accessed via a network or other communication link (e.g. using communication interface 1412).

Although not shown in FIG. 14, the memory 1410 (or a separate memory element not shown in FIG. 14) may be used to store vertex data for newly added vertices in order to reduce computational overheads caused by re-computing the same vertex for different (but adjacent) parent quads.

The computing-based device 1400 may also comprise an input/output controller arranged to output display information to a display device which may be separate from or integral to the computing-based device 1400. The display information may provide a graphical user interface. The input/output controller may also be arranged to receive and process input from one or more devices, such as a user input device (e.g. a mouse or a keyboard). In an embodiment the display device may also act as the user input device if it is a touch sensitive display device. The input/output controller may also output data to devices other than the display device, e.g. a locally connected printing device.

The term 'processor' and 'computer' are used herein to refer to any device, or portion thereof, with processing capability such that it can execute instructions. The term 'processor' may, for example, include central processing units (CPUs), graphics processing units (GPUs or VPUs), physics processing units (PPUs), radio processing units (RPUs), digital signal processors (DSPs), general purpose processors (e.g. a general purpose GPU), microprocessors, any processing unit which is designed to accelerate tasks outside of a CPU, etc. Those skilled in the art will realize that such processing capabilities are incorporated into many different devices and therefore the term 'computer' includes set top boxes, media players, digital radios, PCs, servers, mobile telephones, personal digital assistants and many other devices.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

The methods described herein may be performed by a computer configured with software in machine readable form stored on a tangible storage medium e.g. in the form of a computer program comprising computer readable program code for configuring a computer to perform the constituent portions of described methods or in the form of a computer program comprising computer program code means adapted to perform all the steps of any of the methods described herein when the program is run on a computer and where the computer program may be embodied on a computer readable storage medium. Examples of tangible (or non-transitory) storage media include disks, thumb drives, memory cards etc. and do not include propagated signals. The software can be suitable for execution on a parallel processor or a serial processor such that the method steps may be carried out in any suitable order, or simultaneously.

The hardware components described herein may be generated by a non-transitory computer readable storage medium having encoded thereon computer readable program code.

It is also intended to encompass software which "describes" or defines the configuration of hardware that implements a module, functionality, component or logic described above, such as HDL (hardware description language) software, as is used for designing integrated circuits, or for configuring programmable chips, to carry out desired functions. That is, there may be provided a computer readable storage medium having encoded thereon computer readable program code for generating a processing unit configured to perform any of the methods described herein, or for generating a processing unit comprising any apparatus described herein. That is, a computer system may be configured to generate a representation of a digital circuit from definitions of circuit elements and data defining rules for combining those circuit elements, wherein a non-transitory computer readable storage medium may have stored thereon processor executable instructions that when executed at such a computer system, cause the computer system to generate a processing unit as described herein. For example, a non-transitory computer readable storage medium may have stored thereon computer readable instructions that, when processed at a computer system for generating a manifestation of an integrated circuit, cause the computer system to generate a manifestation of a processor of a receiver as described in the examples herein or to generate a manifestation of a processor configured to perform a method as described in the examples herein. The manifestation of a processor could be the processor itself, or a representation of the processor (e.g. a mask) which can be used to generate the processor.

Memories storing machine executable data for use in implementing disclosed aspects can be non-transitory media. Non-transitory media can be volatile or non-volatile. Examples of volatile non-transitory media include semiconductor-based memory, such as SRAM or DRAM. Examples of technologies that can be used to implement non-volatile memory include optical and magnetic memory technologies, flash memory, phase change memory, resistive RAM.

A particular reference to "logic" refers to structure that performs a function or functions. An example of logic includes circuitry that is arranged to perform those function(s). For example, such circuitry may include transistors and/or other hardware elements available in a manufacturing process. Such transistors and/or other elements may be used to form circuitry or structures that implement and/or contain memory, such as registers, flip flops, or latches, logical operators, such as Boolean operations, mathematical operators, such as adders, multipliers, or shifters, and interconnect, by way of example. Such elements may be provided as custom circuits or standard cell libraries, macros, or at other levels of abstraction. Such elements may be interconnected in a specific arrangement. Logic may include circuitry that is fixed function and circuitry can be programmed to perform a function or functions; such programming may be provided from a firmware or software update or control mechanism. Logic identified to perform one function may also include logic that implements a constituent function or sub-process. In an example, hardware logic has circuitry that implements a fixed function operation, or operations, state machine or process.

Any range or device value given herein may be extended or altered without losing the effect sought, as will be apparent to the skilled person.

It will be understood that the benefits and advantages described above may relate to one embodiment or may relate to several embodiments. The embodiments are not limited to those that solve any or all of the stated problems or those that have any or all of the stated benefits and advantages.

Any reference to 'an' item refers to one or more of those items. The term 'comprising' is used herein to mean including the method blocks or elements identified, but that such blocks or elements do not comprise an exclusive list and an apparatus may contain additional blocks or elements and a method may contain additional operations or elements. Furthermore, the blocks, elements and operations are themselves not impliedly closed.

The steps of the methods described herein may be carried out in any suitable order, or simultaneously where appropriate. The arrows between boxes in the figures show one example sequence of method steps but are not intended to exclude other sequences or the performance of multiple steps in parallel. Additionally, individual blocks may be deleted from any of the methods without departing from the spirit and scope of the subject matter described herein. Aspects of any of the examples described above may be combined with aspects of any of the other examples described to form further examples without losing the effect sought. Where elements of the figures are shown connected by arrows, it will be appreciated that these arrows show just one example flow of communications (including data and control messages) between elements. The flow between elements may be in either direction or in both directions.

It will be understood that the above description of a preferred embodiment is given by way of example only and that various modifications may be made by those skilled in the art. Although various embodiments have been described above with a certain degree of particularity, or with reference to one or more individual embodiments, those skilled in the art could make numerous alterations to the disclosed embodiments without departing from the spirit or scope of this invention.

What is claimed is:

1. A non-transitory computer-readable storage medium storing instructions that, when executed by a computer, cause the computer to perform a method of tessellation in a computer graphics system, the method comprising:
receiving an input comprising at least three vertices defining a patch, each vertex comprising a domain space coordinate and a vertex tessellation factor;
comparing the vertex tessellation factors to a threshold value; and
in response to determining that at least one of the vertex tessellation factors exceeds the threshold value:
generating a center vertex to the patch and calculating a vertex tessellation factor and blend factor for the center vertex;
selecting in turn, each one of the received vertices, and for each selected vertex:
defining a vertex based on the selected vertex; and
in response to determining that the vertex tessellation factor of the selected vertex does not exceed the threshold value and the vertex tessellation factor of a neighbor vertex exceeds the threshold, adding a new vertex to sub-divide an edge between the selected vertex and the neighbor vertex and dividing a sub-quad defined by the defined vertex, the newly added vertex, the center vertex and the other neighbor vertex into two triangles by connecting the defined vertex to a diagonally opposite vertex in the sub-quad.

2. The non-transitory computer-readable storage medium according to claim 1, wherein calculating a vertex tessellation factor and blend factor for the newly added center vertex comprises:
calculating an initial vertex tessellation factor using:

$$InitialTF_{centre} = \sqrt[x]{(TF_0 - 1)(TF_1 - 1) \ldots (TF_{x-1} - 1)} + 1$$

where x is the number of received vertices defining the patch and
calculating the vertex tessellation factor, $TF_{center}$, and blend factor, $BW_{center}$, for the newly added center vertex by:
determining whether $InitialTF_{center}$ is less than two;
in response to determining that $InitialTF_{center}$ is less than 2.0, setting $TF_{center}=1$ and $BW_{center}=BlendWeightFunc(TF_0, TF_1, \ldots, TF_{x-1})$ where:

$$BlendWeightFunc(TF_0, \ldots TF_{x-1}) = MAX_{i=0 \ldots x-1}(MIN(TF_i-1, 1))$$

in response to determining that $InitialTF_{center}$ is not less than 2.0, setting $TF_{center}=InitialTF_{center}/2$ and $BW_{center}=1.0$.

3. The non-transitory computer-readable storage medium according to claim 1, wherein defining a vertex based on the selected vertex comprises:
setting domain space coordinates of the defined vertex equal to the domain space coordinates of the selected vertex;
determining if the vertex tessellation factor of the selected vertex equals 1.0 and if the vertex tessellation factor of the selected vertex is less than 2.0;
in response to determining that the vertex tessellation factor of the selected vertex equals 1.0, setting a vertex tessellation factor of the defined vertex equal to 1.0 and setting a blend factor of the defined vertex equal to the blend factor of the selected vertex;

in response to determining that the vertex tessellation factor of the selected vertex does not equal 1.0 and is less than 2.0, setting a vertex tessellation factor of the defined vertex equal to 1.0 and setting a blend factor of the defined vertex equal to one less than the vertex tessellation factor of the selected vertex; and in response to determining that the vertex tessellation factor of the selected vertex is not less than 2.0, setting a vertex tessellation factor of the defined vertex equal to half of the vertex tessellation factor of the selected vertex and setting a blend factor of the defined vertex equal to one.

4. The non-transitory computer-readable storage medium according to claim 1, wherein adding a new vertex to sub-divide an edge between the selected vertex and the neighbor vertex comprises, for each new vertex $V_M$ which sub-divides an edge between vertices $V_A$ and $V_B$:

calculating an initial vertex tessellation factor for $V_M$ using:

$$InitialTF_M = \sqrt[2]{(TF_A - 1)(TF_B - 1)} + 1$$

and calculating a vertex tessellation factor, $TF_M$, and a blend factor, $BW_M$, for the newly added vertex $V_M$ by:

determining whether $InitialTF_M$ is less than two;

in response to determining that $InitialTF_M$ is less than 2.0, setting $TF_M=1$ and $BW_M=\text{MAX}(\text{MIN}(TF_A-1, 1), \text{MIN}(TF_B-1, 1))$;

in response to determining that $InitialTF_M$ is not less than 2.0, setting $TF_M=InitialTF_M/2$ and $BW_M=1.0$; and setting a position of $V_M$ in domain space to be an average of domain space coordinates of $V_A$ and $V_B$ and at a position in N-dimensional space having a position given by a weighted blend using $BW_M$ of (i) an average of positions of the $V_A$ and $V_B$ in N-dimensional space and (ii) a position of $V_M$ in domain space which is then mapped to N-dimensional space.

5. The non-transitory computer-readable storage medium according to claim 1, wherein the threshold value equals one.

6. The non-transitory computer-readable storage medium according to claim 1, the method further comprising storing vertex data for re-use within a patch or sub-quad, such that a vertex added to subdivide an edge which is part of more than one sub-divided part of the patch or sub-quad is determined only once per patch or sub-quad.

7. The non-transitory computer-readable storage medium according to claim 1, wherein a sub-divided part of a patch or sub-quad comprises a triangle or a sub-quad.

8. A method of performing tessellation in a computer graphics system, the method comprising:

receiving an input comprising at least three vertices defining a patch, each vertex comprising a domain space coordinate and a vertex tessellation factor;

comparing the vertex tessellation factors to a threshold value; and in response to determining that at least one of the vertex tessellation factors exceeds the threshold value:

generating a center vertex to the patch and calculating a vertex tessellation factor and blend factor for the center vertex;

selecting in turn, each one of the received vertices, and for each selected vertex:

defining a vertex based on the selected vertex; and in response to determining that the vertex tessellation factor of the selected vertex does not exceed the threshold value and the vertex tessellation factor of a neighbor vertex exceeds the threshold, adding a new vertex to sub-divide an edge between the selected vertex and the neighbor vertex and dividing a sub-quad defined by the defined vertex, the newly added vertex, the center vertex and the other neighbor vertex into two triangles by connecting the defined vertex to a diagonally opposite vertex in the sub-quad.

9. The method according to claim 8, wherein calculating a vertex tessellation factor and blend factor for the newly added center vertex comprises:

calculating an initial vertex tessellation factor using:

$$InitialTF_{centre} = \sqrt[x]{(TF_0 - 1)(TF_1 - 1) \ldots (TF_{x-1} - 1)} + 1$$

where x is the number of received vertices defining the patch and calculating the vertex tessellation factor, $TF_{center}$, and blend factor, $BW_{center}$, for the newly added center vertex by:

determining whether $InitialTF_{center}$ is less than two;

in response to determining that $InitialTF_{center}$ is less than 2.0, setting $TF_{center}=1$ and $BW_{center}=\text{BlendWeightFunc}(TF_0, TF_1, \ldots, TF_{x-1})$ where:

$$\text{BlendWeightFunc}(TF_0, \ldots TF_{x-1}) = \text{MAX}_{i=0 \ldots x-1}(\text{MIN}(TF_i-1,1))$$

in response to determining that $InitialTF_{center}$ is not less than 2.0, setting $TF_{center}=InitialTF_{center}/2$ and $BW_{center}=1.0$.

10. The method according to claim 8, wherein defining a vertex based on the selected vertex comprises:

setting domain space coordinates of the defined vertex equal to the domain space coordinates of the selected vertex;

determining if the vertex tessellation factor of the selected vertex equals 1.0 and if the vertex tessellation factor of the selected vertex is less than 2.0;

in response to determining that the vertex tessellation factor of the selected vertex equals 1.0, setting a vertex tessellation factor of the defined vertex equal to 1.0 and setting a blend factor of the defined vertex equal to the blend factor of the selected vertex;

in response to determining that the vertex tessellation factor of the selected vertex does not equal 1.0 and is less than 2.0, setting a vertex tessellation factor of the defined vertex equal to 1.0 and setting a blend factor of the defined vertex equal to one less than the vertex tessellation factor of the selected vertex; and in response to determining that the vertex tessellation factor of the selected vertex is not less than 2.0, setting a vertex tessellation factor of the defined vertex equal to half of the vertex tessellation factor of the selected vertex and setting a blend factor of the defined vertex equal to one.

11. The method according to claim 8, wherein adding a new vertex to sub-divide an edge between the selected vertex and the neighbor vertex comprises, for each new vertex $V_M$ which sub-divides an edge between vertices $V_A$ and $V_B$:

calculating an initial vertex tessellation factor for $V_M$ using:

$$InitialTF_M = \sqrt[2]{(TF_A - 1)(TF_B - 1)} + 1$$

and calculating a vertex tessellation factor, $TF_M$, and a blend factor, $BW_M$, for the newly added vertex $V_M$ by:
determining whether $InitialTF_M$ is less than two;
in response to determining that $InitialTF_M$ is less than 2.0, setting $TF_M=1$ and $BW_M=\text{MAX}(\text{MIN}(TF_A-1, 1), \text{MIN}(TF_B-1, 1))$;
in response to determining that $InitialTF_M$ is not less than 2.0, setting $TF_M=InitialTF_M/2$ and $BW_M=1.0$; and
setting a position of $V_M$ in domain space to be an average of domain space coordinates of $V_A$ and $V_B$ and at a position in N-dimensional space having a position given by a weighted blend using $BW_M$ of (i) an average of positions of the $V_A$ and $V_B$ in N-dimensional space and (ii) a position of $V_M$ in domain space which is then mapped to N-dimensional space.

12. The method according to claim 8, wherein the threshold value equals one.

13. The method according to claim 8, the method further comprising storing vertex data for re-use within a patch or sub-quad, such that a vertex added to subdivide an edge which is part of more than one sub-divided part of the patch or sub-quad is determined only once per patch or sub-quad.

14. The method according to claim 8, wherein a sub-divided part of a patch or sub-quad comprises a triangle or a sub-quad.

15. A hardware tessellation unit comprising hardware logic configured to:
receive an input comprising at least three vertices defining a patch, each vertex comprising a domain space coordinate and a vertex tessellation factor;
compare the vertex tessellation factors to a threshold value; and
in response to determining that at least one of the vertex tessellation factors exceeds the threshold value:
generate a center vertex to the patch and calculating a vertex tessellation factor and blend factor for the center vertex;
select in turn, each one of the received vertices, and for each selected vertex:
define a vertex based on the selected vertex; and
in response to determining that the vertex tessellation factor of the selected vertex does not exceed the threshold value and the vertex tessellation factor of a neighbor vertex exceeds the threshold, add a new vertex to sub-divide an edge between the selected vertex and the neighbor vertex and divide a sub-quad defined by the defined vertex, the newly added vertex, the center vertex and the other neighbor vertex into two triangles by connecting the defined vertex to a diagonally opposite vertex in the sub-quad.

16. The hardware tessellation unit according to claim 15, further comprising hardware logic configured to calculate the vertex tessellation factor and blend factor for the newly added center vertex by:
calculating an initial vertex tessellation factor using:

$$InitialTF_{centre} = \sqrt[x]{(TF_0 - 1)(TF_1 - 1) \ldots (TF_{x-1} - 1)} + 1$$

where x is the number of received vertices defining the patch and
calculating the vertex tessellation factor, $TF_{center}$, and blend factor, $BW_{center}$, for the newly added center vertex by:
determining whether $InitialTF_{center}$ is less than two;
in response to determining that $InitialTF_{center}$ is less than 2.0, setting $TF_{center}=1$ and $BW_{center}=\text{BlendWeightFunc}(TF_0, TF_1, \ldots, TF_{x-1})$ where:

$$\text{BlendWeightFunc}(TF_0, \ldots TF_{x-1}).=\text{MAX}_{i=0 \ldots x-1}(\text{MIN}(TF_i-1,1))$$

in response to determining that $InitialTF_{center}$ is not less than 2.0, setting $TF_{center}=InitialTF_{center}/2$ and $BW_{center}=1.0$.

17. The hardware tessellation unit according to claim 15, further comprising hardware logic configured to define a vertex based on the selected vertex by:
setting domain space coordinates of the defined vertex equal to the domain space coordinates of the selected vertex;
determining if the vertex tessellation factor of the selected vertex equals 1.0 and if the vertex tessellation factor of the selected vertex is less than 2.0;
in response to determining that the vertex tessellation factor of the selected vertex equals 1.0, setting a vertex tessellation factor of the defined vertex equal to 1.0 and setting a blend factor of the defined vertex equal to the blend factor of the selected vertex;
in response to determining that the vertex tessellation factor of the selected vertex does not equal 1.0 and is less than 2.0, setting a vertex tessellation factor of the defined vertex equal to 1.0 and setting a blend factor of the defined vertex equal to one less than the vertex tessellation factor of the selected vertex; and
in response to determining that the vertex tessellation factor of the selected vertex is not less than 2.0, setting a vertex tessellation factor of the defined vertex equal to half of the vertex tessellation factor of the selected vertex and setting a blend factor of the defined vertex equal to one.

18. The hardware tessellation unit according to claim 15, further comprising hardware logic configured to add a new vertex to sub-divide an edge between the selected vertex and the neighbor vertex by, for each new vertex $V_M$ which sub-divides an edge between vertices $V_A$ and $V_B$:
calculating an initial vertex tessellation factor for $V_M$ using:

$$InitialTF_M = \sqrt[2]{(TF_A - 1)(TF_B - 1)} + 1$$

and calculating a vertex tessellation factor, $TF_M$, and a blend factor, $BW_M$, for the newly added vertex $V_M$ by:
determining whether $InitialTF_M$ is less than two;
in response to determining that $InitialTF_M$ is less than 2.0, setting $TF_M=1$ and $BW_M=\text{MAX}(\text{MIN}(TF_A-1, 1), \text{MIN}(TF_B-1, 1))$;
in response to determining that $InitialTF_M$ is not less than 2.0, setting $TF_M=InitialTF_M/2$ and $BW_M=1.0$; and
setting a position of $V_M$ in domain space to be an average of domain space coordinates of $V_A$ and $V_B$ and at a position in N-dimensional space having a position given by a weighted blend using $BW_M$ of (i) an average of positions of the $V_A$ and $V_B$ in N-dimensional space and (ii) a position of $V_M$ in domain space which is then mapped to N-dimensional space.

19. The hardware tessellation unit according to claim 15, wherein the threshold value equals one.

20. The hardware tessellation unit according to claim 15, further comprising hardware logic configured to store vertex data for re-use within a patch or sub-quad, such that a vertex added to subdivide an edge which is part of more than one sub-divided part of the patch or sub-quad is determined only once per patch or sub-quad.

* * * * *